(12) United States Patent
Zhang et al.

(10) Patent No.: US 11,314,391 B2
(45) Date of Patent: Apr. 26, 2022

(54) NAVIGATION BAR CONTROLLING METHOD AND TERMINAL

(71) Applicant: GUANGDONG OPPO MOBILE TELECOMMUNICATIONS CORP., LTD., Guangdong (CN)

(72) Inventors: Zhichao Zhang, Guangdong (CN); Guojun Sun, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 25 days.

(21) Appl. No.: 16/644,161

(22) PCT Filed: Sep. 8, 2017

(86) PCT No.: PCT/CN2017/101135
§ 371 (c)(1),
(2) Date: Mar. 3, 2020

(87) PCT Pub. No.: WO2019/047187
PCT Pub. Date: Mar. 14, 2019

(65) Prior Publication Data
US 2021/0216177 A1    Jul. 15, 2021

(51) Int. Cl.
*G06F 3/0484* (2022.01)
(52) U.S. Cl.
CPC .................. *G06F 3/0484* (2013.01)
(58) Field of Classification Search
CPC .................................................. G06F 3/0484
See application file for complete search history.

(56) References Cited

U.S. PATENT DOCUMENTS

| 2004/0036680 A1* | 2/2004 | Davis | G06F 3/0488 345/169 |
| 2006/0123353 A1* | 6/2006 | Matthews | G06F 3/0481 715/779 |

(Continued)

FOREIGN PATENT DOCUMENTS

| CN | 103605456 | 2/2014 |
| CN | 104898950 | 9/2015 |

(Continued)

OTHER PUBLICATIONS

WIPO, ISR for PCT/CN2017/101135, Jun. 7, 2018.

*Primary Examiner* — Mandrita Brahmachari
(74) *Attorney, Agent, or Firm* — Hodgson Russ LLP

(57) ABSTRACT

The present application provides a navigation bar controlling method and device, and relates to the field of human-computer interaction. The method includes displaying a navigation bar, the navigation bar comprising at least one virtual button; starting an application; and displaying at least one function control on the navigation bar according to the running application, wherein the at least one function control is configured to trigger at least one target function of the application. The present application dynamically adds the display of at least one function control on the navigation bar according to the running application, and the at least one function control is configured to trigger the at least one target function of the application. The navigation bar enhances the function of the navigation bar on the basis of the virtual buttons provided natively, with the entry of other functions dynamically provided by the running application.

20 Claims, 14 Drawing Sheets

(56) References Cited

U.S. PATENT DOCUMENTS

| | | | | |
|---|---|---|---|---|
| 2008/0022279 | A1* | 1/2008 | Jung | G06F 9/451 |
| | | | | 718/100 |
| 2008/0163082 | A1* | 7/2008 | Rytivaara | G06F 3/04886 |
| | | | | 715/762 |
| 2009/0158213 | A1* | 6/2009 | Ryu | H04M 1/72466 |
| | | | | 715/825 |
| 2009/0171483 | A1* | 7/2009 | Scheuermann | G05B 19/409 |
| | | | | 700/83 |
| 2009/0309849 | A1* | 12/2009 | Iwema | G06F 3/0482 |
| | | | | 345/173 |
| 2012/0026400 | A1* | 2/2012 | Kang | H04N 21/42214 |
| | | | | 348/570 |
| 2013/0100061 | A1* | 4/2013 | Kawauchi | G06F 3/0488 |
| | | | | 345/173 |
| 2013/0125056 | A1* | 5/2013 | Suda | G06F 3/0482 |
| | | | | 715/846 |
| 2013/0239031 | A1* | 9/2013 | Ubillos | G06F 3/04817 |
| | | | | 715/765 |
| 2014/0354559 | A1 | 12/2014 | Terunuma et al. | |
| 2015/0253955 | A1 | 9/2015 | Chiba et al. | |
| 2017/0344177 | A1* | 11/2017 | Wu | G06F 3/0416 |
| 2019/0012061 | A1* | 1/2019 | Hiranuma | G06F 3/0481 |

FOREIGN PATENT DOCUMENTS

| | | |
|---|---|---|
| CN | 106293472 | 1/2017 |
| CN | 106775425 | 5/2017 |
| CN | 106896982 | 6/2017 |

\* cited by examiner

NAVIGATION BAR CONTROLLING METHOD AND TERMINAL

CROSS-REFERENCE TO RELATED APPLICATION

This application is a U.S. national phase application of International Application No. PCT/CN2017/101135, filed Sep. 8, 2017, the entire disclosure of which is incorporated herein by reference.

TECHNICAL FIELD

The present application relates to the field of human-computer interaction, and more particular, to a navigation bar controlling method and device.

BACKGROUND

In a mobile terminal using an android operating system, a navigation bar is displayed on the bottom area of the touch display screen. There can be three virtual buttons displayed on the navigation bar, and the three virtual buttons include back key, home key, and menu key.

When a user interface of an application is displayed on the touch display screen, the navigation bar is continuously displayed on the bottom area of the touch display screen. When the mobile terminal receives a click signal triggered on the back key, the previous user interface of the application is displayed; when the mobile terminal receives a click signal triggered on the home key, the homepage of the operating system (also called the screen page) is displayed; when the mobile terminal receives a click signal triggered on the menu key, a multi-tasking switching page is displayed, and the multi-tasking switching page is used to switch between multiple applications.

SUMMARY

The embodiments of the application provide a navigation bar controlling method and device, which can solve the problem that the navigation bar occupies a more favorable operating area on the mobile terminal, but the functions provided by the current navigation bar are relatively single. The technical solution is as follows.

According to a first aspect of the embodiments of the present application, a navigation bar controlling method is provided, and the method includes:

displaying a navigation bar, the navigation bar comprising at least one virtual button;

starting an application; and displaying at least one function control on the navigation bar according to the running application, wherein the at least one function control is configured to trigger at least one target function of the application.

According to a second aspect of the embodiments of the present application, a navigation bar controlling device is provided, and the device includes:

a display module, configured to display a navigation bar, the navigation bar comprising at least one virtual button;

a starting module, configured to start an application; and wherein the display module is configured to display at least one function control on the navigation bar according to the running application, and the at least one function control is configured to trigger at least one target function of the application.

According to a third aspect of the embodiments of the present application, a terminal is provided, and the terminal includes a processor and a memory, wherein the memory stores at least one instruction, and the at least one instruction is executed by the processor to implement the following operations:

displaying a navigation bar, the navigation bar comprising at least one virtual button;

starting an application; and displaying at least one function control on the navigation bar according to the running application, wherein the at least one function control is configured to trigger at least one target function of the application.

According to a fourth aspect of the embodiments of the present application, a computer readable medium is provided, and the computer readable medium stores at least one instruction, and the at least one instruction is executed by a processor to implement the following operations:

displaying a navigation bar, the navigation bar comprising at least one virtual button;

starting an application; and displaying at least one function control on the navigation bar according to the running application, wherein the at least one function control is configured to trigger at least one target function of the application.

The beneficial effects of the technical solutions provided in the embodiments of the present application are:

At least one function control is displayed dynamically on the navigation bar according to the running application, and the at least one function control is configured to trigger the at least one target function of the application. The navigation bar enhances the function of the navigation bar on the basis of the virtual buttons provided natively, with the entry of other functions dynamically provided by the running application. It solves the problem that the navigation bar occupies a more favorable operating area on the mobile terminal, but the functions provided by the current navigation bar are relatively single.

BRIEF DESCRIPTION OF THE DRAWINGS

In order to more clearly illustrate the technical solutions in the embodiments of the application, the drawings to be used in the embodiments are briefly described below. Obviously, the following drawings are just for certain embodiments of the application, and other drawings can be obtained according to these drawings without any creative effort for those skilled in the art.

DETAILED DESCRIPTION

To make the objectives, technical solutions, and advantages of the present application clearer, the embodiments of the present application will be described in further detail below with reference to the accompanying drawings.

The "module" mentioned herein generally refers to programs or instructions stored in a memory capable of implementing certain functions. As used herein, "plurality" refers to two or more. "And/or" describes the association relationship between related objects and indicates that there can be three types of relationships. For example, A and/or B can indicate that there are three cases in which A exists alone, both A and B exist, and B exists alone. The character "/" generally indicates that the related objects are an "or" relationship.

Figure 1:
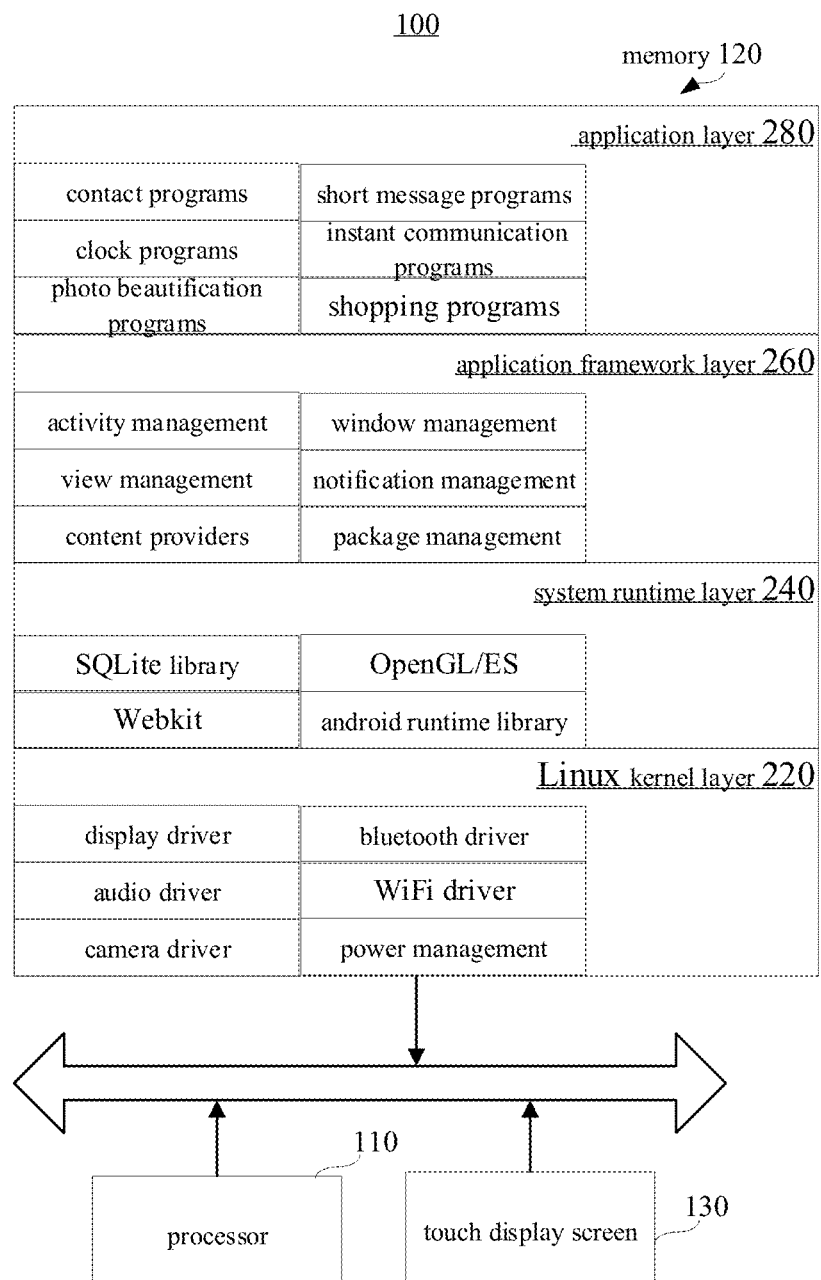
FIG. 1 is a structural block view of a terminal according to an exemplary embodiment of the present application.
Figure 2:
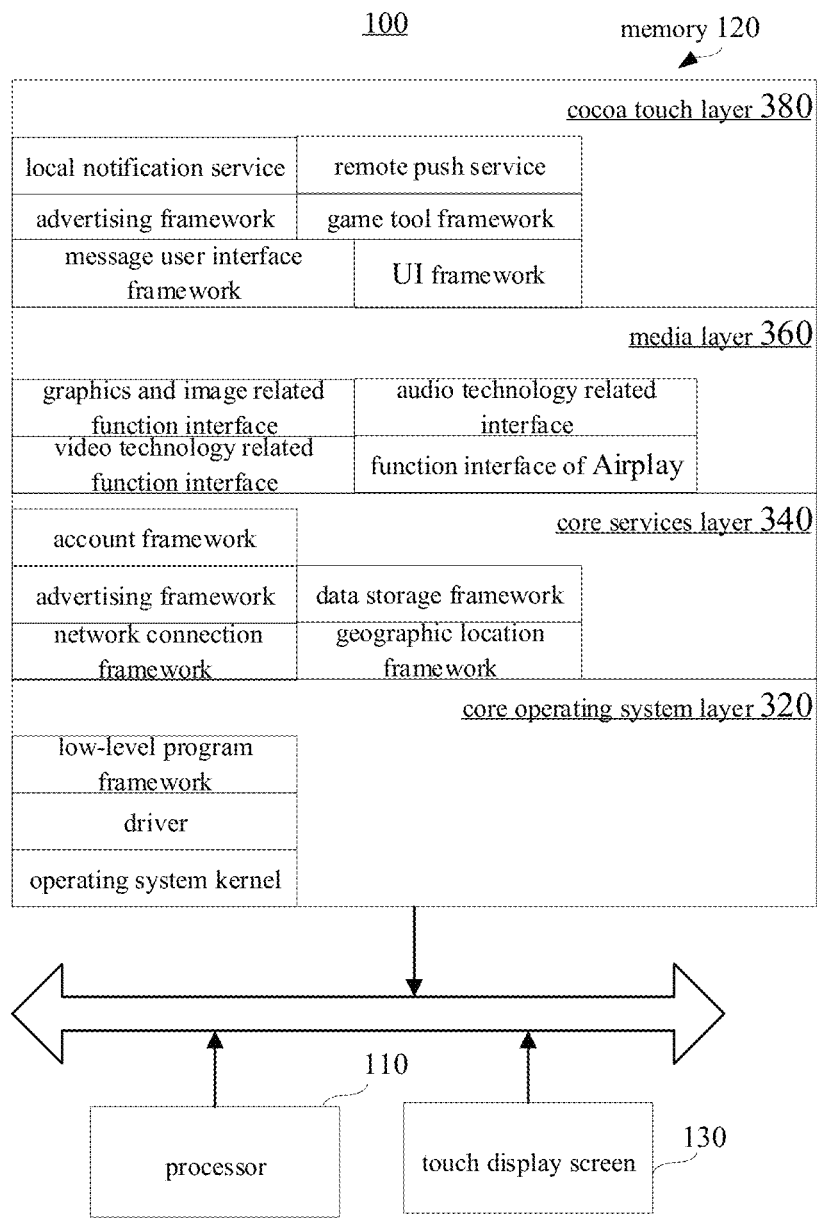
FIG. 2 is a structural block view of a terminal according to another exemplary embodiment of the present application.

As refer to FIG. 1 and FIG. 2, a structural block view of a terminal 100 is provided according to an exemplary embodiment of the present application. The terminal 100 may be a mobile phone, a tablet computer, a notebook computer, an e-book, or the like. The terminal 100 in the present application may include one or more of the following components: a processor 110, a memory 120, and a touch display screen 130.

The processor 110 may include one or more processing cores. The processor 110 uses various interfaces and lines to connect various parts in the entire terminal 100, and executes various functions of the terminal 100 and processes data by running or executing instructions, programs, code sets, or instruction sets stored in the memory 120. Optionally, the processor 110 may be implemented in at least one of digital signal processing (DSP), field-programmable gate array (FPGA), and programmable logic array (PLA). The processor 110 may integrate one or a combination of more of a central processing unit (CPU), a graphics processing unit (GPU), and a modem. Among them, the CPU mainly processes the operating system, user interfaces, and applications, and the like; the GPU is configured to render and draw content to be displayed by the touch display screen 130; and the modem is used to process wireless communication. It can be understood that the modem may not be integrated into the processor 110, and may be implemented by a single chip.

The memory 120 may include a random access memory (RAM), and may also include a read-only memory. Optionally, the memory 120 includes a non-transitory computer-readable storage medium. The memory 120 may be used to store instructions, programs, codes, code sets, or instruction sets. The memory 120 may include a program storage area and a data storage area, where the program storage area may store instructions for implementing an operating system, instructions for at least one function (such as a touch function, a sound playback function, an image playback function, etc.), instructions for implementing the following method embodiments, and the like; the data storage area may store data (such as audio data, phone book) created according to the use of the terminal 100 and the like. The memory 120 further stores at least one instruction, and when the at least one instruction is executed by the processor 110, the navigation bar controlling method provided in the following method embodiment is implemented.

Taking an android system as the operating system as an example, the programs and data stored in the memory 120 are shown in FIG. 1. The memory 120 stores a Linux kernel layer 220, a system runtime layer 240, an application framework layer 260, and an application layer 280. The Linux kernel layer 220 provides low-level drivers for various hardware of the terminal 100, such as a display driver, an audio driver, a camera driver, a bluetooth driver, a Wi-Fi driver, and power management. The system runtime layer 240 provides main feature support for the android system through some C/C++ libraries. For example, the SQLite library provides database support, the OpenGL/ES library provides 3D drawing support, and the Webkit library provides browser kernel support. An android runtime library is also provided in the system runtime layer 240, which mainly provides some core libraries, which can allow developers to use the Java language to write android applications. The application framework layer 260 provides various APIs that may be used when building applications. Developers can also use these APIs to build their own applications, such as activity management, window management, view management, notification management, content providers, package management, call management, resource management, and location management. At least one application is running in the application layer 280, and these applications may be contact programs, short message programs, clock programs, camera applications and so on that are native to the operating system, or the applications may be developed by third-party developers, such as instant communication programs, photo beautification programs and so on.

Taking an IOS system as the operating system as an example, the programs and data stored in the memory 120 are shown in FIG. 2. The IOS system includes a core operating system layer 320 (Core OS layer), a core services layer 340, a media layer 360, and a cocoa touch layer 380. The core operating system layer 320 includes an operating system kernel, drivers, and low-level program frameworks. These low-level program frameworks provide functions closer to the hardware for use by the program framework located in the core service layer 340. The core service layer 340 provides system services and/or program frameworks required by applications, such as a foundation framework, an account framework, an advertising framework, a data storage framework, a network connection framework, a geographic location framework, a motion framework, and the like. The media layer 360 provides audio-visual-related interfaces for applications, such as graphics and image related interfaces, audio technology related interfaces, video technology related interfaces, wireless playback interface for audio and video transmission technology (such as AirPlay), and the like. The cocoa touch layer 380 provides various commonly-used interface-related frameworks for application development. The cocoa touch layer 380 is used for user touch interaction operations on the terminal 100. For example, a local notification service, a remote push service, an advertising framework, a game tool framework, a message user interface (UI) framework, a user interface (UIKit) framework, a map framework, and so on.

Among the framework shown in FIG. 2, the frameworks related to most applications include, but are not limited to, the basic framework in the core service layer 340 and the UIKit framework in the cocoa touch layer 380. The basic framework provides many basic object classes and data types, provides the most basic system services for all applications, and regardless of the UI. The classes provided by the UIKit framework are basic UI class libraries for creating touch-based user interfaces. IOS applications can provide UIs based on the UIKit framework, so the UIKit framework provides the application's infrastructure for building user interfaces and drawing, handling user interaction events, responding to gestures, and the like.

The touch display screen 130 is used to receive a touch operation on or near the touch display screen 130 using a finger, a touch pen, or any suitable object by uses, and to display user interfaces of various applications. The touch display screen 130 is generally disposed on a front panel of the terminal 130. The touch display screen 130 may be designed as a full screen, a curved screen or a special-shaped screen. The touch display screen 130 can also be designed as a combination of a full screen and a curved screen, and a combination of a special-shaped screen and a curved screen, which is not limited in this embodiment.

Full Screen

Figure 3A:
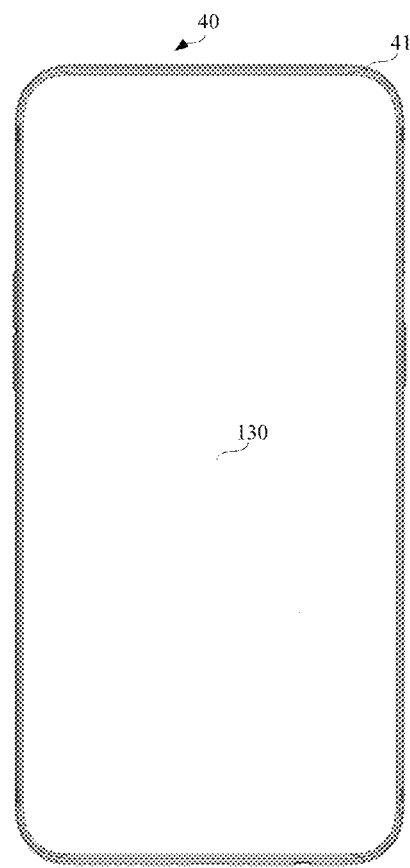
FIG. 3A to FIG. 3E are schematic appearance views of a terminal according to an exemplary embodiment of the present application.

The full screen may refer to a screen design in which the touch screen display 130 occupies the front panel of the terminal 100 with a screen ratio exceeding a threshold (such as 80% or 90% or 95%). One calculation method of the screen ratio is (the area of the touch display screen 130/the area of the front panel of the terminal 100)*100%; another calculation method of the screen ratio is (the actual display area in the touch display screen 130/the area of the front panel area of the terminal 100)*100%; another calculation method of the screen ratio is (diagonal line of the touch display screen 130/diagonal line on the front panel of the terminal 100)*100%. In the schematic example shown in FIG. 3A, almost all areas on the front panel of the terminal 100 are the area of the touch display screen 130. On the front panel 40 of the terminal 100, areas other than the edges caused by the middle frame 41 are the area of the touch display screen 130. The four corners of the touch display screen 130 may be right-angled or rounded.

The full screen may also be a screen design in which at least one front panel component is integrated inside or below the touch display screen 130. Optionally, the at least one front panel component includes a camera, a fingerprint sensor, a proximity light sensor, a distance sensor, and the like. In some embodiments, other components on the front panel of the conventional terminal are integrated in all or part of the touch display screen 130. For example, after the photosensitive element in the camera is split into multiple photosensitive pixels, each photosensitive pixel is integrated in a black area of each display pixel in the touch display screen 130. Since at least one front panel component is integrated inside the touch display screen 130, the full screen has a higher screen ratio.

Of course, in other embodiments, the front panel components on the front panel of the conventional terminal can also be set on the side or back of the terminal 100. For example, an ultrasonic fingerprint sensor is set under the touch display screen 130, and a bone conduction handset is disposed inside the terminal 100, and the camera is disposed on the side of the terminal and is pluggable.

In some optional embodiments, when the screen of the terminal 100 is a full screen, a single side or multiple sides of the middle frame of the terminal 100 (such as any one of the four sides of the upper, lower, left, and right sides, or any two or more sides) are provided with an edge touch sensor 120, which is used to detect at least one of a user's touch operation, click operation, press operation, and slide operation on the middle frame. The edge touch sensor 120 may be any one of a touch sensor, a thermal sensor, and a pressure sensor. The user can apply an operation on the edge touch sensor 120 to control applications in the terminal 100.

Curved Screen

Figure 3B:
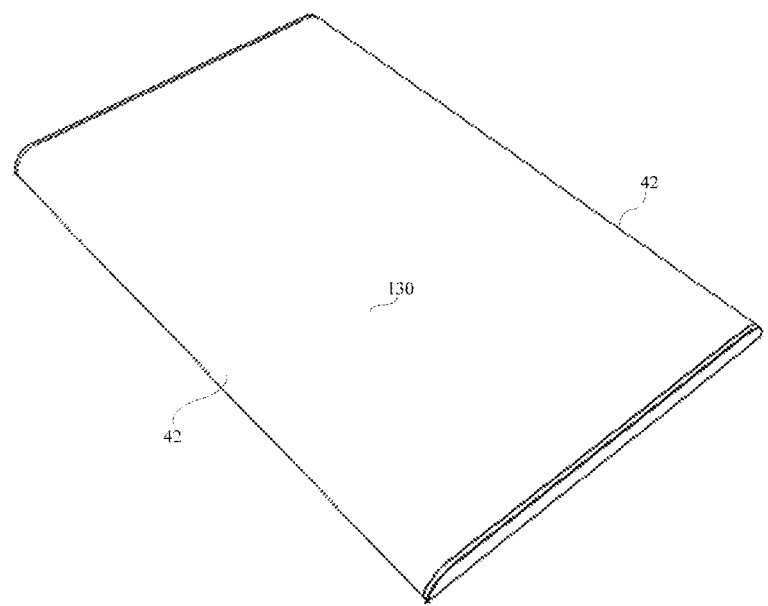

The curved screen refers to a screen design in which the screen area of the touch display screen 130 is not in a plane. Generally, the curved screen has at least one cross section, the cross section has a curved shape, and the projection of the curved screen on any plane perpendicular to the cross section is a plane. The curved shape may be U-shaped. Optionally, the curved screen refers to a screen design manner in which at least one side is a curved shape. Optionally, the curved screen refers to that at least one side of the touch display screen 130 extends to cover the middle frame of the terminal 100. Since the side of the touch display screen 130 extends to the middle frame of the terminal 100, the middle frame without the display function and the touch function is also covered as a displayable area and/or an operable area, so that the curved screen has a higher screen ratio. Optionally, as shown in the example shown in FIG. 3B, the curved screen refers to a screen design in which the left and right sides 42 are curved; or the curved screen refers to a screen design in which the upper and lower sides are curved; or the curved screen refers to a screen design in which the upper, lower, left, and right sides are curved. In an alternative embodiment, the curved screen is made of touch screen material with a certain flexibility.

Special-Shaped Screen

The special-shaped screen is a touch display screen with an irregular appearance. The irregular shape is not a rectangle or a rounded rectangle. Optionally, the special-shaped screen refers to a screen design provided with a protrusion, a notch, and/or a hole on the rectangular or rounded rectangular touch display screen 130. Optionally, the protrusion, the notch and/or the hole can be defined at the edge of the touch display screen 130, the center of the touch display screen 130, or both. When the protrusion, the notch and/or the hole is defined on one edge, it can be defined at the middle or both ends of the edge; when the protrusion, the notch and/or the hole is defined at the center of the screen, it can be defined at one or more areas of the upper area, upper left area, left area, lower left area, lower area, lower right area, right area, and upper right area of the screen. When arranged in multiple areas, the protrusion, notch and hole can be defined at a centralized or distributed manner; and can be defined symmetrically or asymmetrically. Optionally, the number of the protrusion, notch and/or dig hole is not limited.

The special-shaped screen covers the upper and/or lower area of the touch display screen as a displayable area and/or an operable area, so that the touch display screen takes up more area on the front panel of the terminal, and the special-shaped screen has a higher screen ratio. In some embodiments, the notch and/or hole is used to accommodate at least one front panel component, which includes at least one of the camera, the fingerprint sensor, the proximity light sensor, the distance sensor, the handset, an ambient light brightness sensor, and a physical button.

Figure 3C:
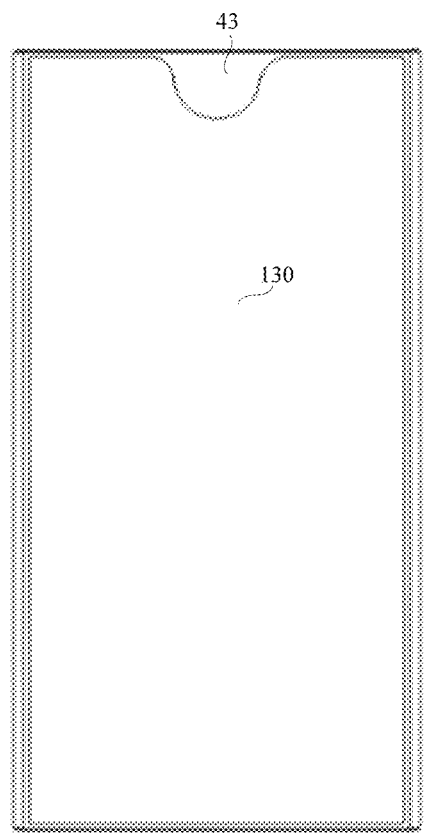
Figure 3D:
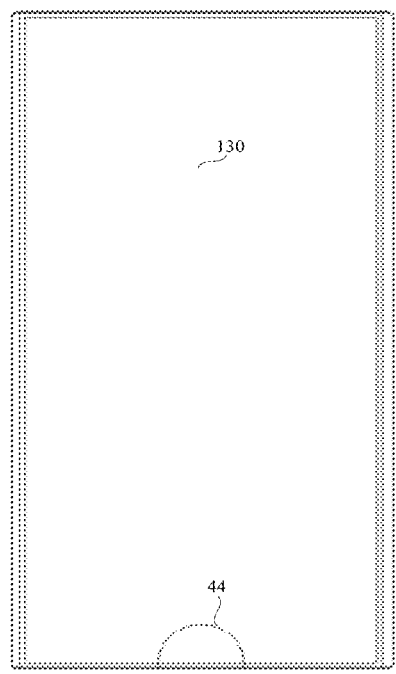
Figure 3E:
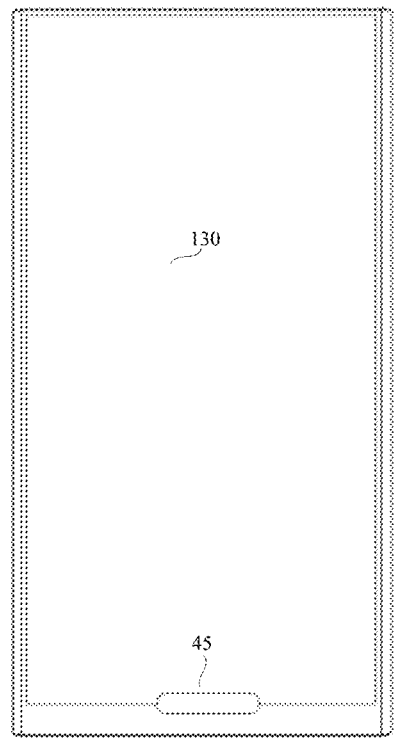

Exemplarily, the notch may be defined at one or more edges, and the notch may be a semi-circular notch, a right-angled rectangular notch, a rounded rectangular notch, or an irregularly-shaped notch. In the example shown in FIG. 3C schematically, the special-shaped screen may be a screen design defined with a semi-circular notch 43 in the middle of the upper edge of the touch display screen 130. The space vacated by the semi-circular notch 43 is used to accommodate at least one front panel component of the camera, the distance sensor (also called to as a proximity sensor), the handset, and the ambient light brightness sensor. As shown schematically in FIG. 3D, the special-shaped screen may be a screen design defined with a semi-circular notch 44 in the middle of the lower edge of the touch display screen 130. The space vacated by the semi-circular notch 44 is used to accommodate at least one of the physical button, the fingerprint sensor, and a microphone. In the example shown schematically in FIG. 3E, the special-shaped screen may be a screen design defined with a semi-elliptical notch 45 in the middle of the lower edge of the touch display screen 130, another semi-elliptical notch is also defined on the front panel of the terminal 100, the two semi-elliptical notches define an elliptical space, and the elliptical space is used to accommodate the physical button or a fingerprint recognition module. As a non-limiting example, the special-shaped screen may be a screen design defined with at least one small hole in the upper half of the touch display screen 130, and the space vacated by the small hole is used to accommodate at least one of front panel components of the camera, the distance sensor, the handset, and the ambient light sensor.

In addition, those skilled in the art can understand that the structure of the terminal 100 shown in the above drawings does not constitute a limitation on the terminal 100. The terminal may include more or fewer components than shown in the drawings, or combine some components, or different component arrangements. For example, the terminal 100 further includes components such as a radio frequency circuit, an input unit, a sensor, an audio circuit, a wireless fidelity (WiFi) module, a power supply, and a bluetooth module, which are not described herein again.

First, a few terms involved in this application are introduced.

Android operating system: A Linux-based free and open source operating system produced by Google Inc. of the United States, mainly used in mobile devices.

Application: App for short. In the android operating system, an application usually includes at least one program component. There are four types of program components: activity component, service component, content provider component and broadcast receiver component.

Activity component: The component in the android application that is responsible for interacting with the user. It provides a visual user interface for the android application. An Android application can include zero or more activity components.

Service component: The component in the android application that runs in the background and does not provide a user interface. The service component is usually used to process data. An Android application can include zero or more service components.

Content provider component: the component in the android application that provides data to other applications or other components in the current application, such as: ringtones, wallpapers, phonebooks, etc. The content provider component can encapsulate data in various formats and provide it to other applications or components for use in a standard form.

Broadcast receiver component: The broadcast receiver component is used to receive and respond to messages broadcast by the operating system. It can receive messages that it is interested in (or a message of a predefined message type), and then process or forward them to other components in the current application.

Intent message: A message in the android application that enables communication between various program components. Different program component can be different components in the same application or different components in different applications. The intent message is responsible for describing the action of an operation in the application, the action involves data, and additional data. According to the description of the intent message, the android operating system is responsible for finding the corresponding program component, passing the intent message to the invoked program component, and completing the invoke of the program component. Intent messages include two types: explicit intent messages and implicit intent messages.

Explicit intent messages: for intent messages that explicitly indicate the name of the target program component, they are called explicit intent messages. For example, A program component needs to send an intent message of "Invoke 18688888888", and if A program component wants B program component to respond to the intent message, A program component specifies that the target program component is B program component. After receiving the intent message, the android operating system will hand the intent message to the B program component for processing.

Implicit intent messages: For intent messages that do not explicitly indicate the name of the target program component, they are called implicit intent messages. For example, A component needs to send an intent message of "Call 18688888888", and if A component does not know which program component the intent message should be responded to, A component can not specify the target program component in the intent message. After receiving the intent message, the android operating system will check the type of intent message monitored by each program component in advance. If the program component B is monitoring the intent message related to the phone call, the android operating system passes the intent message to B program component to process. Alternatively, the android operating system may broadcast the intent message, which is received and processed by a broadcast receiver component interested in the intent message related to the phone call.

Figure 4A:
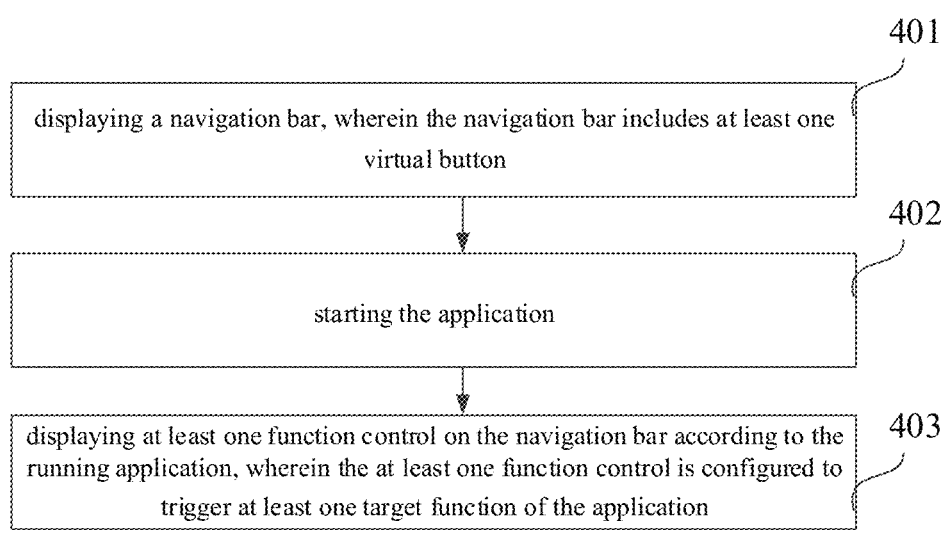
FIG. 4A is a flowchart view of a navigation bar controlling method according to an exemplary embodiment of the present application.

Please refer to FIG. 4A, which illustrates a flowchart view of the navigation bar controlling method provided by an exemplary embodiment of the present application. The navigation bar controlling method may be applied to the terminal 100 provided in the above illustration. The method for controlling a navigation bar includes the followings.

Operation 401: displaying a navigation bar, wherein the navigation bar includes at least one virtual button.

Figure 4B:
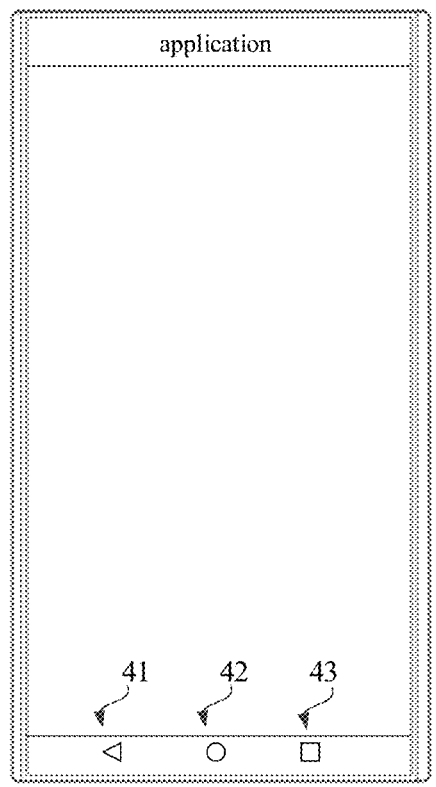
FIG. 4B is a schematic interface view of a navigation bar according to an exemplary embodiment of the present application.

Taking the android operating system as an example, the navigation bar is a control provided by the operating system for displaying at least one virtual button. The navigation bar can be displayed on the bottom display area of the touch display screen, also known as the bottom navigation bar. The at least one virtual button displayed on the navigation bar may be a system-level virtual button. As shown in FIG. 4B, the at least one virtual button includes, but is not limited to, a back key 41, a home key 42, and a menu key 43.

Optionally, the icon shape of the back key is triangular, the icon shape of the home key is circular, and the icon shape of the menu key is rectangular, square, or three parallel horizontal short lines. The three virtual buttons can be equally spaced and displayed on the navigation bar.

Optionally, the navigation bar is running parallel to the user interface of the application, or the display priority of the navigation bar is higher than the display priority of the user interface of the application, and so the navigation bar is always displayed on the user interface of the application.

Operation 402, starting the application.

In the process of using the terminal by the user, the user can manually start the application. Alternatively, the application is automatically started by the operating system.

Operation 403, displaying at least one function control on the navigation bar according to the running application, wherein the at least one function control is configured to trigger at least one target function of the application.

In the process of using the terminal by the user, multiple applications are started and closed. The terminal adds the at least one function control to the navigation bar according to the running application, and the at least one function control is used to trigger the at least one target function in the running application.

Optionally, the at least one function control is displayed on the navigation bar after the running application is started; or, the at least one function control is displayed on the navigation bar when the running application is switched from the foreground running state to the background running state; or, the function control is displayed on the navigation bar when the foreground running interface of the already running application is switched to a preset interface.

Optionally, the running application is a recently started application, or an application currently in the foreground running state, or an application that switches from a foreground switching state to the background running state.

Figure 4C:
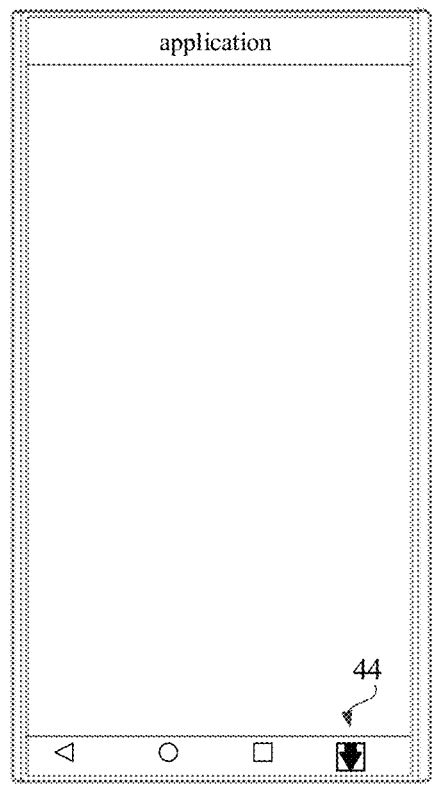
FIG. 4C is a schematic interface view of an enhanced navigation bar according to an exemplary embodiment of the present application.

Optionally, the terminal displays the at least one function control on the navigation bar in the running application. As shown in FIG. 4C, the at least one function control may be a button control 44.

Optionally, there are one or more functional controls. When there are multiple function controls, each function control corresponds to its own target function.

Optionally, the at least one function control and the at least one virtual button are equally spaced on the navigation bar.

In summary, the navigation bar controlling method provided in this embodiment displays at least one function control on the navigation bar according to the running application, and the at least one function control is configured to trigger the at least one target function of the application. The navigation bar enhances the function of the navigation bar on the basis of the virtual buttons provided natively, with the entry of other functions dynamically provided by the running application. It solves the problem that the navigation bar occupies a more favorable operating area on the mobile terminal, but the functions provided by the current navigation bar in the related art are relatively single.

In an optional embodiment, the operation of displaying at least one function control on the navigation bar according to the running application includes:

receiving a first invoke request from the running application to a preset function interface, wherein the first invoke request is configured to set the at least one function control and the at least one target function, and the preset function interface is provided by an operating system for editing a display state of the navigation bar; and displaying the at least one function control on the navigation bar.

In an optional embodiment, the operation of receiving a first invoke request from the running application to a preset function interface includes:

receiving the first invoke request from the application to the preset function interface, after the running application is started; or receiving the first invoke request from the application to the preset function interface, when the running application is switched from a foreground running state to a background running state; or receiving the first invoke request from the application to the preset function interface, when a foreground operation activity of the running application is switched to a preset activity.

In an optional embodiment, the operation of displaying the at least one function control on the navigation bar includes:

obtaining a current holding mode, wherein the holding mode is one of a left-hand holding mode and a right-hand holding mode; displaying the at least one function control on a left area of the navigation bar, and displaying the at least one virtual button on a right area of the navigation bar, when the current holding mode is the left-hand holding mode; displaying the at least one function control on the right area of the navigation bar, and displaying the at least one virtual button on the left area of the navigation bar, when the current holding mode is the right-hand holding mode.

In an optional embodiment, the at least one function control and the at least one virtual button are equally spaced on the navigation bar.

In an optional embodiment, the at least one function control includes at least two function controls.

The operation of displaying the at least one function control on the navigation bar includes:

displaying an aggregation button on the navigation bar;

receiving a first signal triggered on the aggregation button;

replacing the virtual button and the aggregation button on the navigation bar with the at least two function controls according to the first signal.

In an optional embodiment, after the operation of replacing the virtual button and the aggregation button on the navigation bar with the at least two function controls according to the first signal, the method further includes:

receiving a second signal triggered on the navigation bar;

restoring the at least two function controls on the navigation bar to the virtual button and the aggregation button according to the second signal.

In an optional embodiment, after the operation of displaying at least one function control on the navigation bar according to the running application, the method further includes:

receiving a touch signal triggered on the at least one function control;

performing the at least one target function corresponding to the at least one function control according to the touch signal.

In an optional embodiment, the application includes a function of file downloading, the at least one function control is configured to display a download state, and the at least one target function is configured to view the downloaded content; or the application includes a function of text editing, the at least one function control is configured to adjust a text size, and the at least one target function is configured to increase the text size or reduce the text size; or the application includes a function of text editing, the at least one function control is configured to adjust a font, and the at least one target function is configured to change the font, add an underline, bold the font, or tilt the front; or the application includes a function of text editing, the at least one function control is configured to adjust a paragraph format, and the at least one target function includes at least one of left alignment, right alignment, and center alignment; or the application includes a function of text displaying, the at least one function control is configured to adjust a screen brightness, and the at least one target function is configured to increase the screen brightness or decrease the screen brightness; or the application includes a function of file receiving, the at least one function control is configured to display a recently received file, and the at least one target function is configured to open the recently received file; or the application includes a function of message receiving, the at least one function control is configured to display a prompt of a recently received message, and the at least one target function is configured to display the recently received message; or the application includes a function of screenshot, the at least one function control is configured to display a thumbnail of a screenshot image, and the at least one target function is configured to display the screenshot image; or the application includes a function of sharing a target file, the at least one function control is configured to trigger a sharing access of a displaying file, and the at least one target function is configured to share the target file to other applications; or the application includes a function of multimedia file playback, the at least one function control is configured to control a playback state, and the at least one target function includes at least one of starting playback, pausing playback, playing the previous file, playing the next file, fast forward playback, fast backward playback and adjusting volume.

In an optional embodiment, after the operation of displaying at least one function control on the navigation bar according to the running application, the method further includes:

removing the display of the function control from the navigation bar when the application exits.

In an optional embodiment, after the operation of displaying at least one function control on the navigation bar according to the running application, the method further includes:

receiving a second invoke request from the running application to the preset function interface, wherein the second invoke request is configured to cancel the at least one function control and the at least one target function; and removing the display of the at least one function control from the navigation bar.

All the above-mentioned optional embodiments may be combined in any way to form optional embodiments of the present application, which are not described in detail here.

Figure 5A:
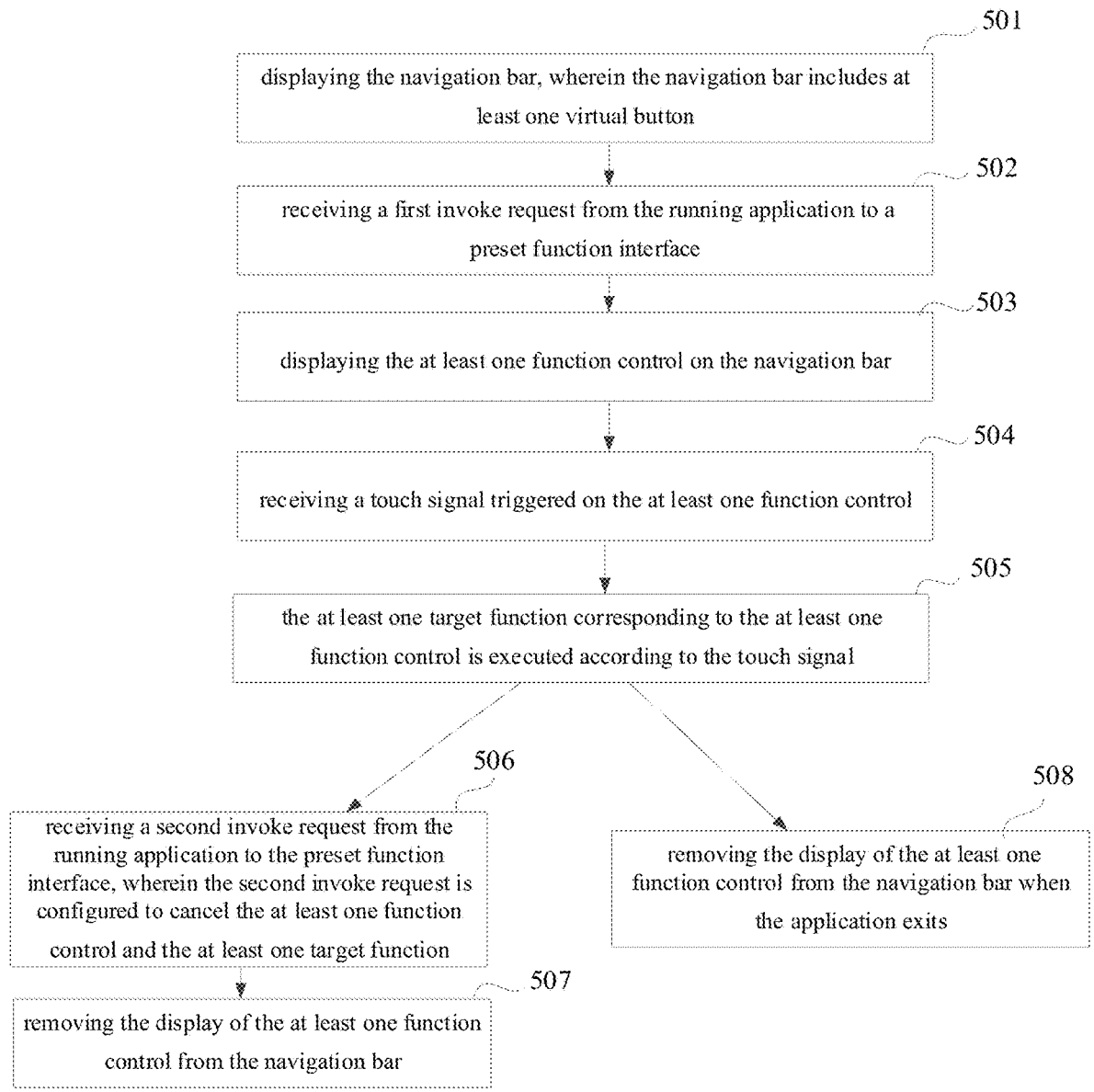
FIG. 5A is a flowchart view of a navigation bar controlling method according to another exemplary embodiment of the present application.

Please refer to FIG. 5A, which illustrates a flowchart view of the navigation bar controlling method provided by another exemplary embodiment of the present application.

The navigation bar controlling method may be applied to the terminal 100 provided in the above illustration. The method for controlling a navigation bar includes the followings.

Operation 501: displaying the navigation bar, wherein the navigation bar includes at least one virtual button.

Taking the android operating system as an example, the navigation bar is a control provided by the operating system for displaying at least one virtual button. The navigation bar can be displayed on the bottom display area of the touch display screen. The at least one virtual button displayed on the navigation bar may be a system-level virtual button. The at least one virtual button includes, but is not limited to, a back key, a home key, and a menu key.

Optionally, the icon shape of the back key is triangular, the icon shape of the home key is circular, and the icon shape of the menu key is rectangular or three parallel horizontal lines. The three virtual buttons can be displayed evenly on the navigation bar.

Operation 502: receiving a first invoke request from the running application to a preset function interface.

The operating system of the terminal provides the application with the preset function interface. The preset function interface is an interface provided by the operating system to each application. The preset function interface is configured to edit a display state of the navigation bar. The application can invoke the preset function interface and add at least one function control on the navigation bar. Each function control corresponds to at least one target function. The at least one target function can be provided by the running application or provided by another application.

After the application is running, the application may send the first invoke request to the operating system. The first invoke request is configured to request the operating system to set the at least one function control and the at least one target function.

Optionally, after the running application is started, the application sends the first invoke request to the operating system, the operating system receives the first invoke request from the application to the preset function interface. For example, the application is an e-book reading program, the e-book reading program sends the first invoke to the operating system after startup. The first invoke request is used to request that a brightness adjustment control be displayed on the navigation bar, and the brightness adjustment control is used to increase or decrease the screen brightness.

Optionally, when the running application is switched from the foreground running state to the background running state, the application sends the first invoke request to the operating system, and the operating system receives the first invoke request from the application to the preset function interface. For example, the application is a download application. During the process of downloading the video file, when the download application switches from the foreground running state to the background running state, the download application sends the first invoke request to the operating system, the first invoke request is used to request that at least one function control is displayed on the navigation bar, and the at least one function control is used to display the real-time download progress of the video file.

Optionally, when the foreground operation interface of the running application is switched to the preset interface, the application sends the first invoke request to the operating system, and the operating system receives the first invoke request from the application to the preset function interface. For example, the application is a mail program. When the foreground operation interface of the mail program is switched to the mail editing interface, the mail program sends the first invoke request to the operating system. The first invoke request is used to request that the at least one function control related to text editing be displayed on the navigation bar. This function control is used to provide at least one of the functions of editing the text size, changing the font, adding the underline, bolding the font, tilting the font, left alignment, right alignment, and center alignment.

After receiving the first invoke request, the operating system determines the at least one function control to be displayed according to the first invoke request.

Operation 503, displaying the at least one function control on the navigation bar.

The terminal adds one or more function controls to the navigation bar according to the first invoke request.

Figure 5B:
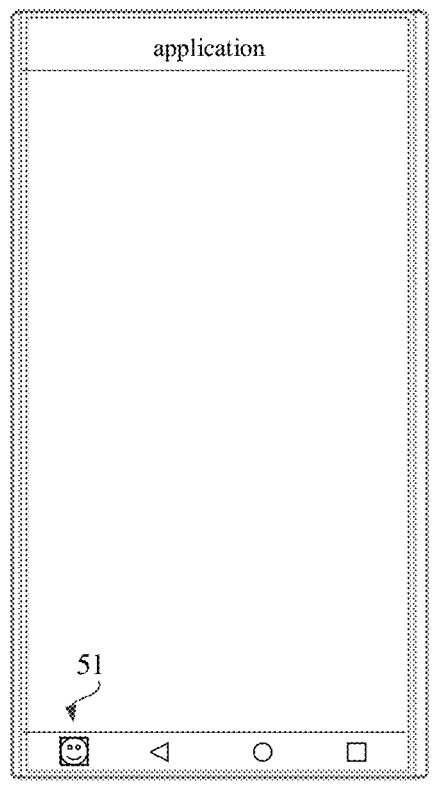
FIG. 5B to FIG. 5D are schematic interface views of enhanced navigation bars according to another exemplary embodiment of the present application.

Optionally, as shown in FIG. 5B, the operating system displays the at least one function control 51 on a left area of the navigation bar, and displays the at least one virtual button on a right area of the navigation bar. That is, the function control 51 is on the far left of the three virtual buttons.

Figure 5C:
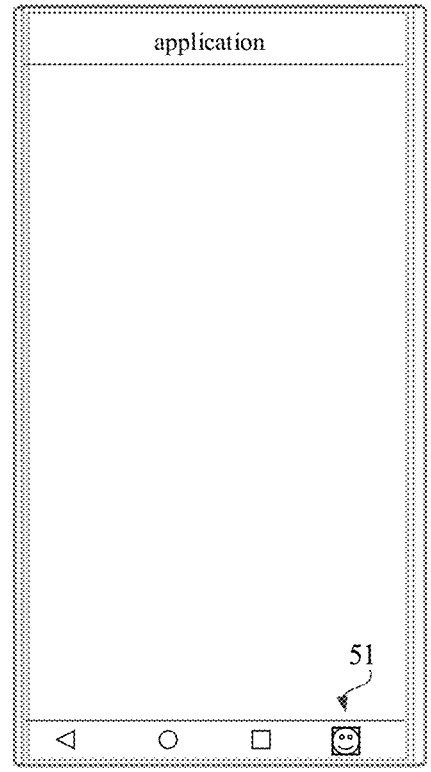

Optionally, as shown in FIG. 5C, the operating system displays the at least one function control 51 on the right area of the navigation bar, and displays the at least one virtual button on the left area of the navigation bar. That is, the function control 51 is on the far right of the three virtual buttons.

Figure 5D:
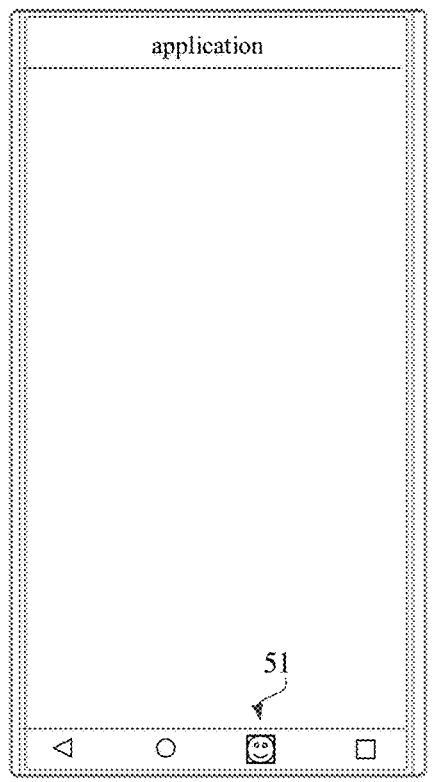

Optionally, as shown in FIG. 5D, the operating system displays the at least one function control 51 between two virtual buttons.

Optionally, the at least one function control is at least one of a button control, an edit text control, an image view control, and a progress bar control.

Operation 504, receiving a touch signal triggered on the at least one function control.

Optionally, the user performs a click operation on the at least one function control displayed on the touch display screen. The click operation applied by the user will trigger the click touch signal on the touch display screen, and the processor in the terminal receives the click touch signal triggered on the at least one function control.

Alternatively, the user performs a double-click operation on the at least one function control displayed on the touch display. The double-click operation applied by the user will trigger a double-click touch signal on the touch display, and the processor in the terminal receives the double-click touch signal triggered on the function control.

Alternatively, the user performs a long-press operation on the at least one function control displayed on the touch display screen. The long-press operation applied by the user will trigger a long-press touch signal on the touch display screen, and the processor in the terminal receives the long-press touch signal triggered on the function control.

Alternatively, the user performs a sliding operation on the at least one function control displayed on the touch display. The sliding operation applied by the user will trigger a sliding touch signal on the touch display screen, and the processor in the terminal receives the sliding touch signal triggered on the function control. The sliding touch signal may be any one of a slide-up touch signal, a slide-down touch signal, a slide-left touch signal, and a slide-right touch signal.

Operation 505, the at least one target function corresponding to the at least one function control is executed according to the touch signal.

Optionally, the terminal executes the at least one target function corresponding to the at least one function control according to the touch signal. After receiving the touch signal on the at least one function control, the operating system in the terminal calls back the target function corresponding to the function control to generate an intent message. The operating system finds the corresponding program component according to the intent message, and the program component completes the realization of the corresponding target function.

Among them, the intent message enables communication between various program components. Different program component can be different components in the same application or different components in different applications. The intent message is responsible for describing the action of an operation in the application, the action involves data, and additional data. According to the description of the intent message, the android operating system is responsible for finding the corresponding program component, passing the intent message to the invoked program component, and completing the invoke of the program component.

Optionally, the function control corresponds to at least two different target functions, and the terminal executes different target functions corresponding to the function control according to different touch signals. For example, the terminal executes a first function corresponding to the function control according to the click touch signal, and executes a second function corresponding to the function control according to the double-click touch signal.

The above at least one function control can be dynamically removed and displayed on the navigation bar, and the display can be removed in any of the following two different implementation methods. The following operations 506 and 507 illustrate a first method to remove the display, and operation 508 illustrates a second method to remove the display.

Operation 506, receiving a second invoke request from the running application to the preset function interface, wherein the second invoke request is configured to cancel the at least one function control and the at least one target function.

When the running application does not need to display the at least one function control, the running application sends a second invoke request to the operating system, and the second invoke request is used to invoke the preset function interface to cancel the display of the at least one function control.

Optionally, when the foreground running interface of the running application exits the preset interface, the application sends the second invoke request to the operating system, and the second invoke request is used to cancel the at least one function control and the at least one target function. For example, the application is a mail program. When the foreground running interface of the mail program is switched from the mail editing interface to other interfaces, the mail program sends the second invoke request to the operating system, and the second invoke request is used to request to cancel the display of the at least one function control related to text editing on the navigation bar.

Optionally, the preset function interface for receiving the first call request and the preset function interface for receiving the second call request are the same function interface or different function interfaces.

Operation 507, removing the display of the at least one function control from the navigation bar.

The operating system removes the display of the at least one function control from the navigation bar according to the second invoke request. Optionally, the navigation bar is restored to the initial state.

In this operation, removing the at least one function control does not affect the normal running of the application, that is, the application can continue to run normally, and the process of removing the function control is actively triggered by the application.

Operation 508, removing the display of the at least one function control from the navigation bar when the application exits.

When the operating system detects that the application exit, the operating system can actively remove the display of the function control from the navigation bar.

It should be noted that the first method to remove the display shown in operations 506-507 and the second method to remove the display shown in operation 508 are independent and run parallel with each other. Operation 508 may be performed before operation 506, or after operation 507, or between operation 506 and operation 507, which is not limited in this embodiment.

In summary, the navigation bar controlling method provided in this embodiment dynamically add the display of at least one function control on the navigation bar according to the running application, and the at least one function control is configured to trigger the at least one target function of the application. The navigation bar enhances the function of the navigation bar on the basis of the virtual buttons provided natively, with the entry of other functions dynamically provided by the running application. It solves the problem that the navigation bar occupies a more favorable operating area on the mobile terminal, but the functions provided by the current navigation bar are relatively single.

The navigation bar controlling method provided in this embodiment removes the display of the at least one function control on the navigation bar when the application exits or actively cancels, so that the navigation bar is restored to the initial state when the at least one function control do not need to be displayed, the invalid occupation of blank areas in the navigation bar is reduced, and the operability of the navigation bar is enhanced.

Figure 6:
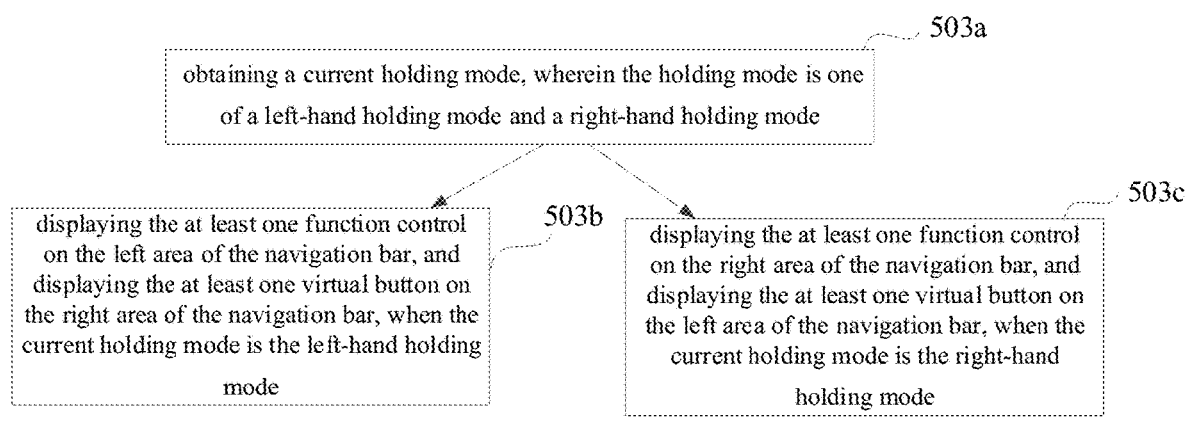
FIG. 6 is a flowchart view of a navigation bar controlling method according to another exemplary embodiment of the present application.

In an optional embodiment, operation 503 can also be replaced with operations 503a, 503b, and 503c, as shown in FIG. 6.

Operation 503a, obtaining a current holding mode, wherein the holding mode is one of a left-hand holding mode and a right-hand holding mode.

Optionally, an edge touch sensor is disposed on a middle frame of the terminal, and the edge touch sensor includes a left edge touch sensor located on a left side of the middle frame and a right edge touch sensor located on a right side of the middle frame. When the user holds the terminal with one hand, the at least one left edge touch sensor collects at least one left contact signal, and the at least one right edge touch sensor collects at least one right contact signal.

Since a first contact area between the palm and the edge touch sensor is relatively large and a second contact area between the finger and the edge touch sensor is relatively small, it is determined that the current holding mode is the left-hand holding mode, when the contact area corresponding to the at least one left contact signal is larger than the contact area corresponding to the at least one right contact signal, and when the contact area corresponding to the at least one right contact signal is larger than the contact area corresponding to the at least one left contact signal, it is determined that the current holding method is a right-hand holding method.

Operation 503b, displaying the at least one function control on the left area of the navigation bar, and displaying the at least one virtual button on the right area of the navigation bar, when the current holding mode is the left-hand holding mode;

Operation 503c, displaying the at least one function control on the right area of the navigation bar, and displaying the at least one virtual button on the left area of the navigation bar, when the current holding mode is the right-hand holding mode.

In summary, the navigation bar controlling method provided in the embodiments displays the at least one function control in the left area or the right area of the navigation bar according to the current holding method, and it is convenient for the user to operate the at least one function control, and improves the operation efficiency when the user touches the at least one function control.

Figure 7:
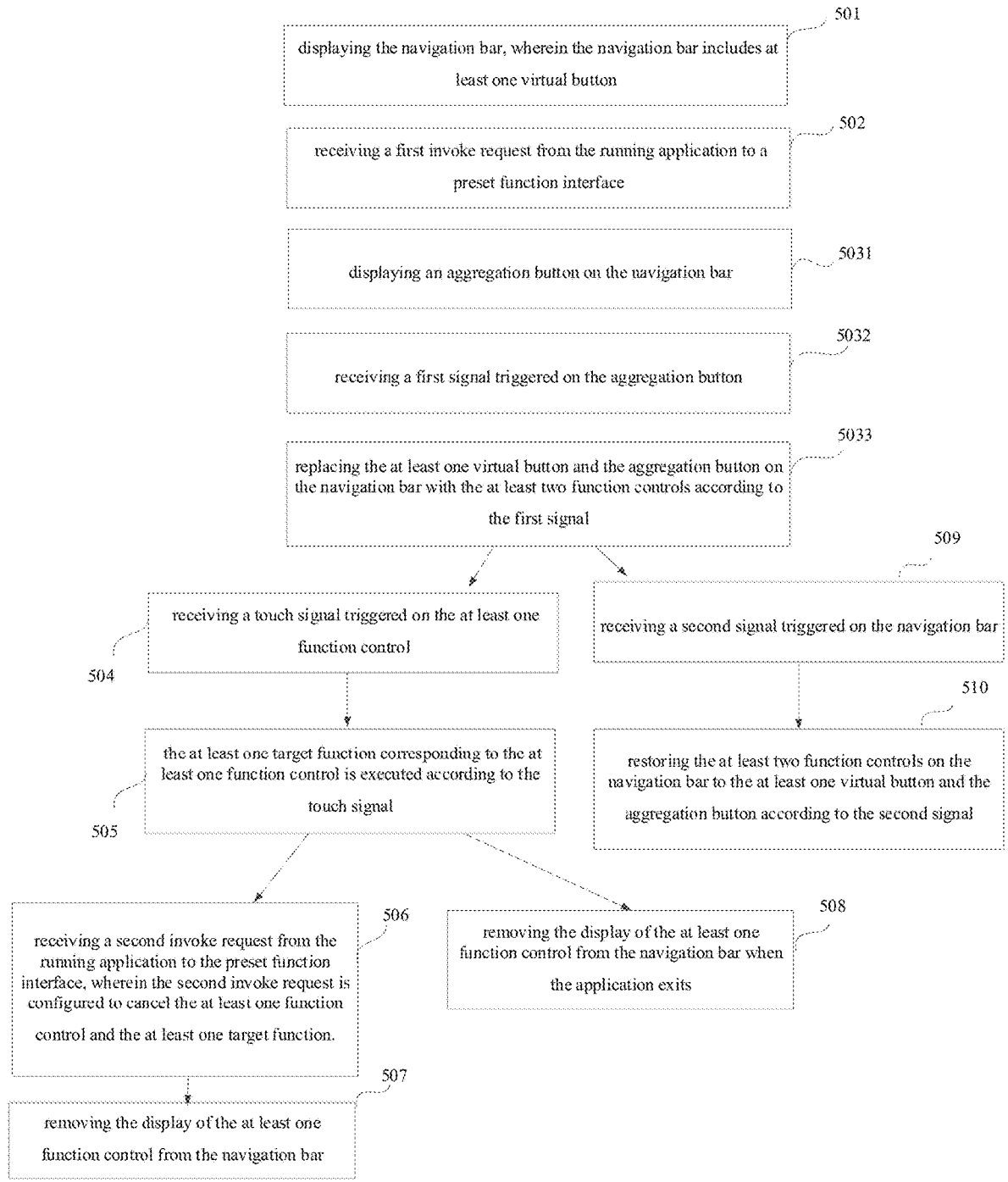
FIG. 7 is a flowchart view of a navigation bar controlling method according to an exemplary embodiment of the present application.

In an optional embodiment, the at least one function control includes at least two function controls, operation 503 can also be replaced with operations 5031, 5032, and 5033, as shown in FIG. 7.

Operation 5031, displaying an aggregation button on the navigation bar.

When there are at least two function controls, the operating system may display the aggregation button on the navigation bar, and the aggregation button is used to trigger to display the at least two function controls. The aggregate button can be displayed on the left area of the navigation bar, on the left of all of the at least one virtual button; the aggregate button can also be displayed on the right area of the navigation bar, on the right of all of the at least of virtual button; the aggregate button can also be displayed between two virtual buttons.

Figure 8:
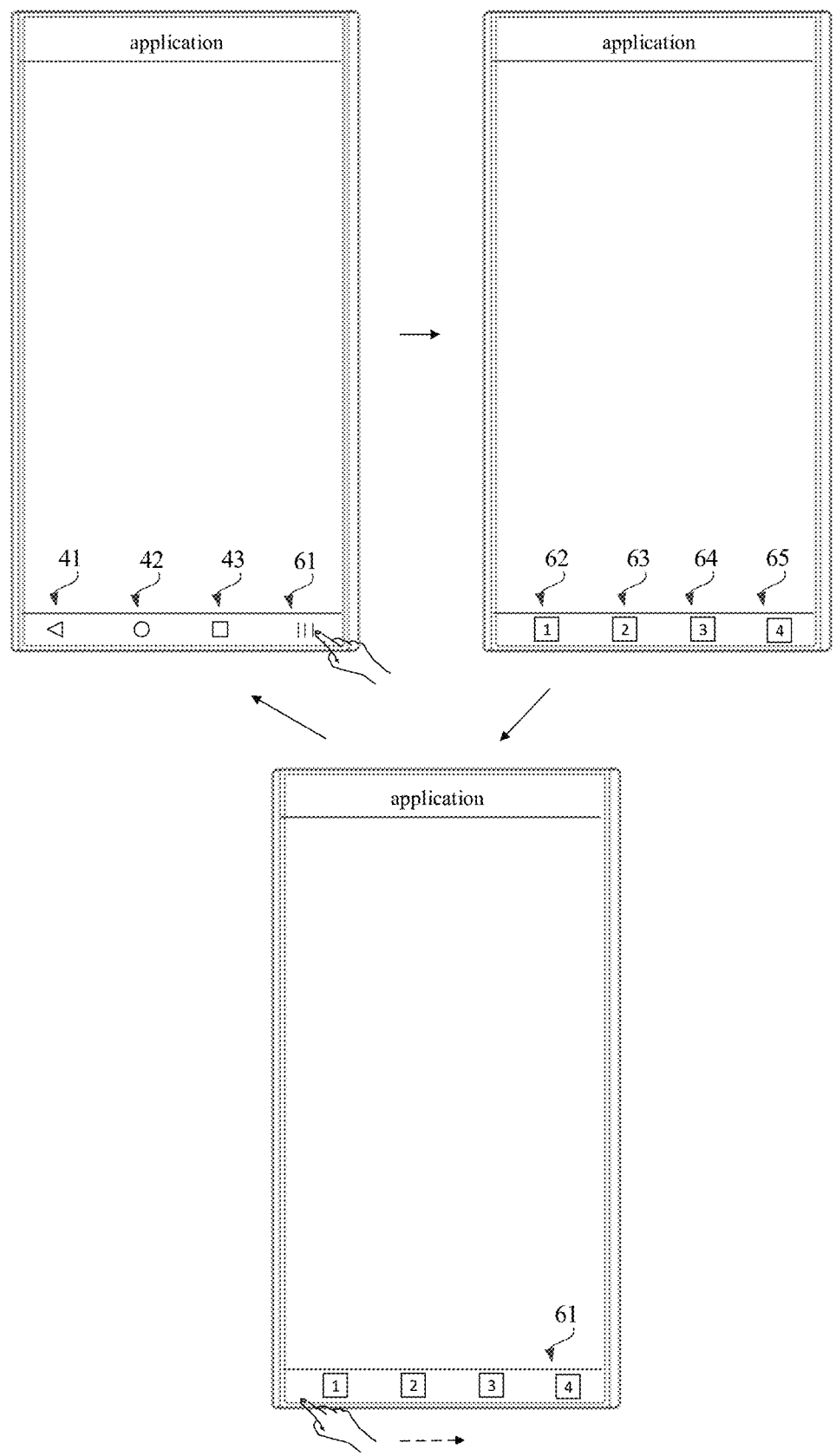
FIG. 8 is a schematic interface view of a navigation bar controlling method according to an exemplary embodiment of the present application during specific implementation.

As shown in FIG. 8, after receiving the first invoke request of the running application, the aggregation button 61 is displayed on the right area of the navigation bar.

Operation 5032, receiving a first signal triggered on the aggregation button.

When the user needs to use the at least one function control, the user can touch the aggregate button. The operating system receives the first signal triggered on the aggregate button.

Operation 5033, replacing the at least one virtual button and the aggregation button on the navigation bar with the at least two function controls according to the first signal.

After receiving the first signal, the operating system replaces all or part of the virtual buttons and the aggregation button in the navigation bar with at least two functional controls.

As shown in FIG. 8, the application is the e-book reading program, which invokes the operating system to display four function controls 62 to 65. The operating system first displays the aggregation button 61 on the navigation bar. After the operating system receives the user's click signal on the aggregation button 61, the three virtual buttons 41 to 43 in the navigation bar are canceled, and then the four function controls 62 to 65 are displayed on the navigation bar.

When the user does not need to use the function control, the navigation bar can also return to the initial display state. After operation 503, the following operations may also be included.

Operation 509, receiving a second signal triggered on the navigation bar.

The second signal may be a left-sliding signal on the navigation bar, a right-sliding signal on the navigation bar, or a clicking signal on the blank area of the navigation bar.

Optionally, when a restore button is also displayed on the navigation bar, the second signal is generated by clicking the restore button, and the implementation manner of the second signal is not limited in the embodiments of the present application.

Operation 510, restoring the at least two function controls on the navigation bar to the at least one virtual button and the aggregation button according to the second signal.

After receiving the second signal, the operating system cancels the display of the function controls in the navigation bar, and then restoring the display of the at least one virtual button.

As shown in FIG. 8, when the function control is not needed, the user slides right on the navigation bar. The operating system cancels the display of the function controls 62 to 65 in the navigation bar according to the right-slide signal, and restores the display of the three virtual buttons 41 to 43 and the aggregation button 61 on the navigation bar.

In summary, the navigation bar controlling method provided in the embodiments provides the navigation button on the navigation bar to enable the navigation bar to switch between a first display state and a second display state. The first display state is used to display the at least one operation system-level virtual button and the second display state is used to display multiple function controls, thereby displaying more operable elements in the limited display area on the navigation bar, and improving the display efficiency of the navigation bar.

The function controls displayed on the navigation bar are different and the target functions corresponding to the function controls are different, when the running applications are different. For example, the at least one function control and the at least one target function include but not limited to at least one of the following types.

1, when the application includes the function of file downloading, the at least one function control is configured to display the download state, and the at least one target function is configured to view the downloaded content.

Figure 9:
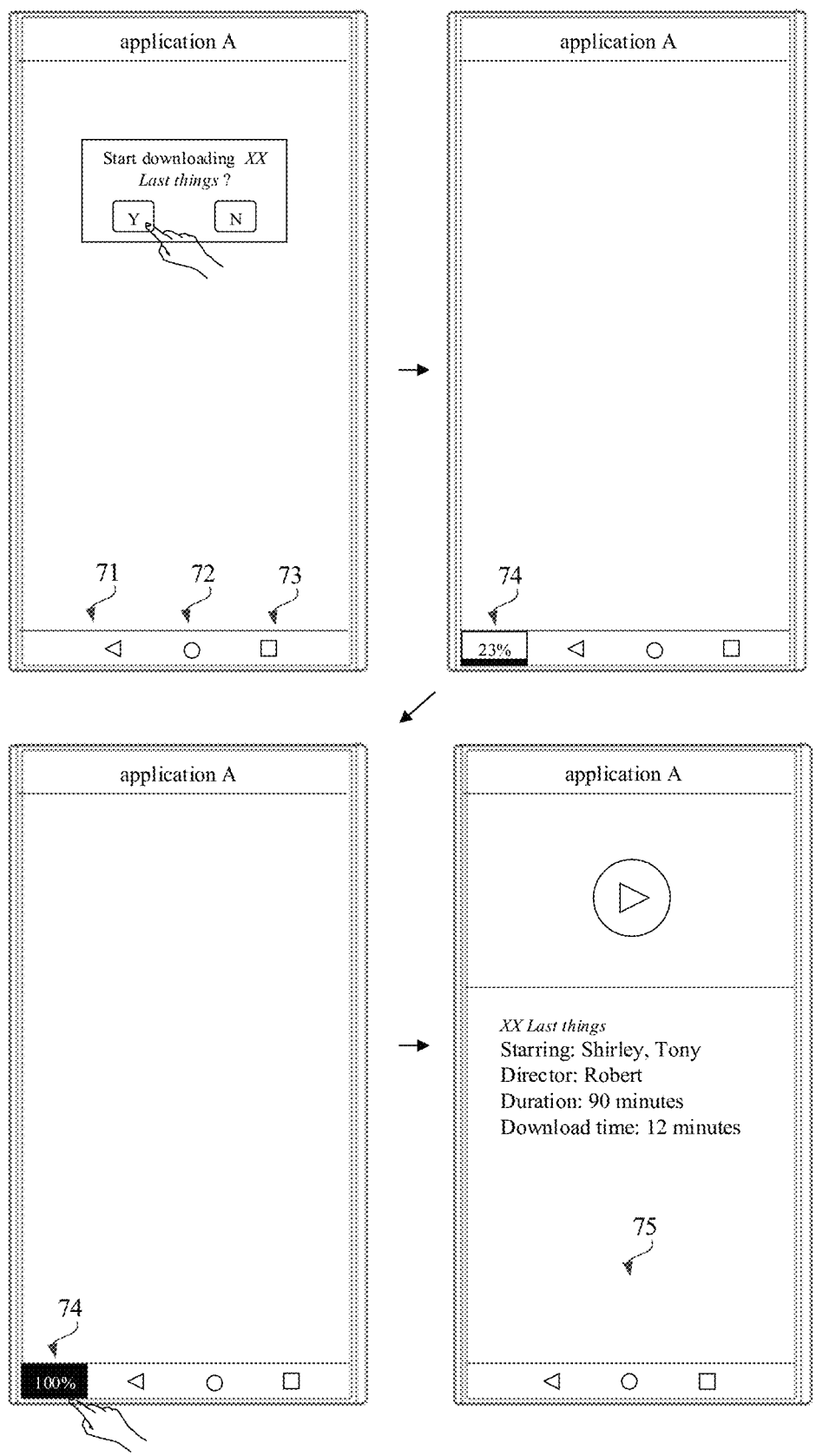
FIG. 9 is a schematic interface view of a navigation bar controlling method according to an exemplary embodiment of the present application during specific implementation.

Referring to FIG. 9, in an initial state, the navigation bar 70 displayed on the terminal includes the back key 71, the home key 72, and the menu key 73. When the application A with downloading capability starts to download the video file XX Last Things, the application A sends the first invoke request to the operating system through the preset function interface, and the first invoke request is used to request to set a control for displaying the download state and a function for viewing the downloaded content corresponding to the control. The operating system displays the function control 74 on the navigation bar according to the first invoke request, and the function control 74 is displayed on the far left of the navigation bar. The function control 74 can display the download progress in real time, that is, the function control 74 can display the percentage of the downloaded data to the total data or the download abnormal information. Optionally, when the download progress does not reach 100%, the function control 74 is in an inoperable state. When the download progress reaches 100%, the function control 74 is in an operable state. If the user clicks on the functional control 74 in the operable state, the operating system callbacks a function interface for viewing the downloaded content of application A, opens the download details page 75 for the video file, and views the downloaded video file XX Last Things.

Optionally, while the function control 74 displays the download progress, the user may switch the application A to a background running state, and switch at least one other application to a foreground running state.

Optionally, after the user views the downloaded video file XX Last Things, the application A sends the second invoke request to the operating system through the preset function interface, and the second invoke request is used to cancel the display of the function control 74. Alternatively, when the application A exits, the display of the function control 74 is cancelled by the operating system.

2, when the application includes the function of text editing, the at least one function control includes a first control configured to adjust the text size and a second control configured to adjust the screen brightness, and the at least one target function corresponding to the first control is configured to increase the text size or reduce the text size, the at least one target function corresponding to the second control is configured to increase the screen brightness or decrease the screen brightness.

Figure 10:
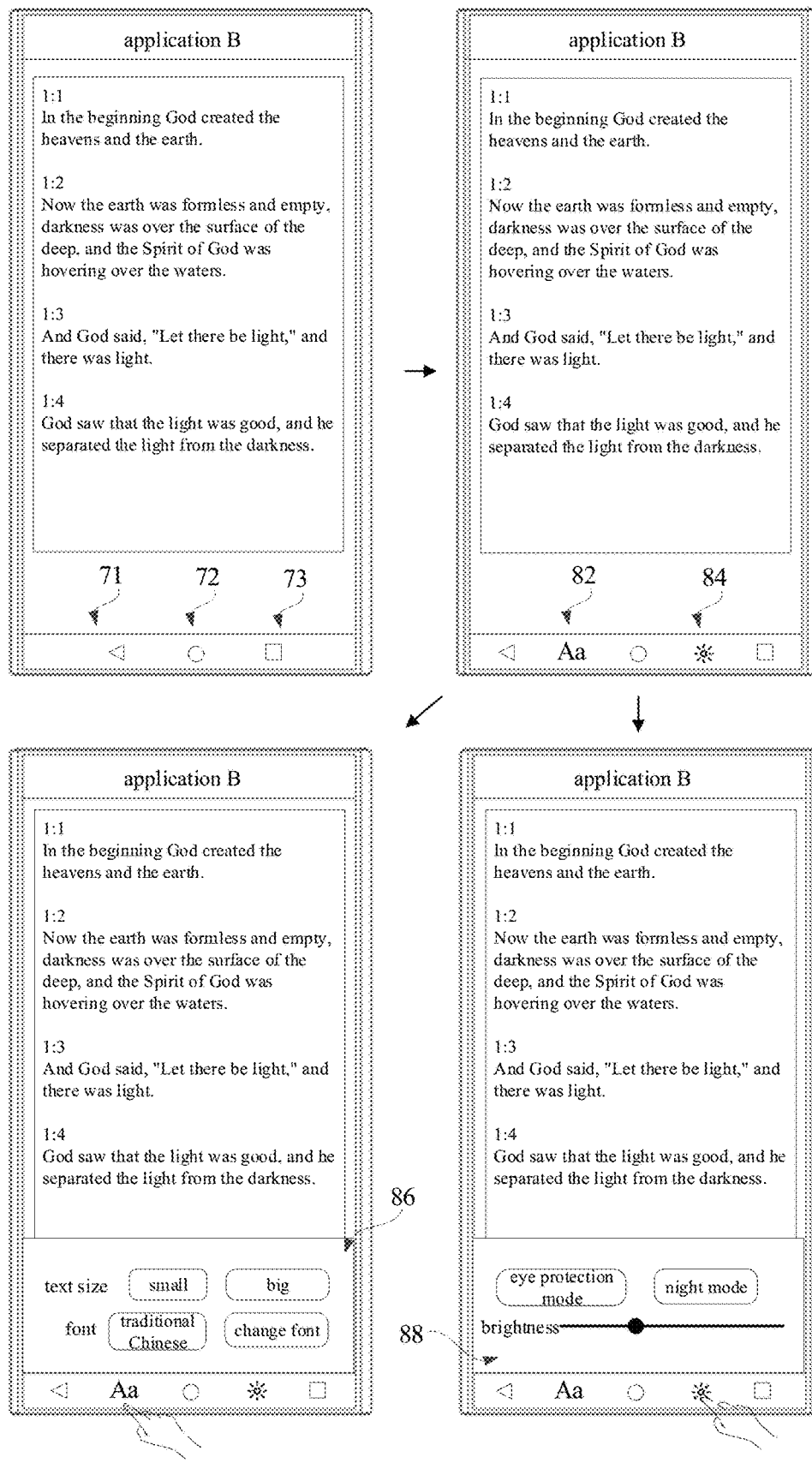
FIG. 10 is a schematic interface view of a navigation bar controlling method according to an exemplary embodiment of the present application during specific implementation.

Referring to FIG. 10, in the initial state, the navigation bar 70 displayed on the terminal includes the back key 71, the home key 72, and the menu key 73. When the application B with the text reading ability starts to read the e-book, the application B sends the first invoke request to the operating system through the preset function interface, and the first invoke request is used to request to set the first control for adjusting the text size and the function of increasing the text size or reducing the text size corresponding to the first control, the second control for adjusting the screen brightness, and the function of increasing or decreasing the screen brightness corresponding to the second control. The operating system displays the first control 82 and the second control 84 on the navigation bar according to the first invoke request, the first control 82 is displayed between the back key 71 and the home key 72, and the second control 82 is displayed between the home key 72 and the menu key 73. Optionally, after the first control 82 is clicked, a font size adjustment interface 86 may be popped up, and the text size in the e-book can be increased or decreased, the font can be directly modified. After the second control 84 is clicked, a brightness adjustment interface 88 for adjusting the screen brightness may be popped up, and then the screen brightness of the touch display screen may be adjusted.

Optionally, when the application B exits, the display of the first control 82 and the second control 84 is cancelled by the operating system.

3, when the application includes the function of multimedia file playback, the at least one function control is configured to control the playback state, and the at least one target function includes at least one of starting playback, pausing playback, playing the previous file, playing the next file, fast forward playback, fast backward playback and adjusting volume.

Figure 11:
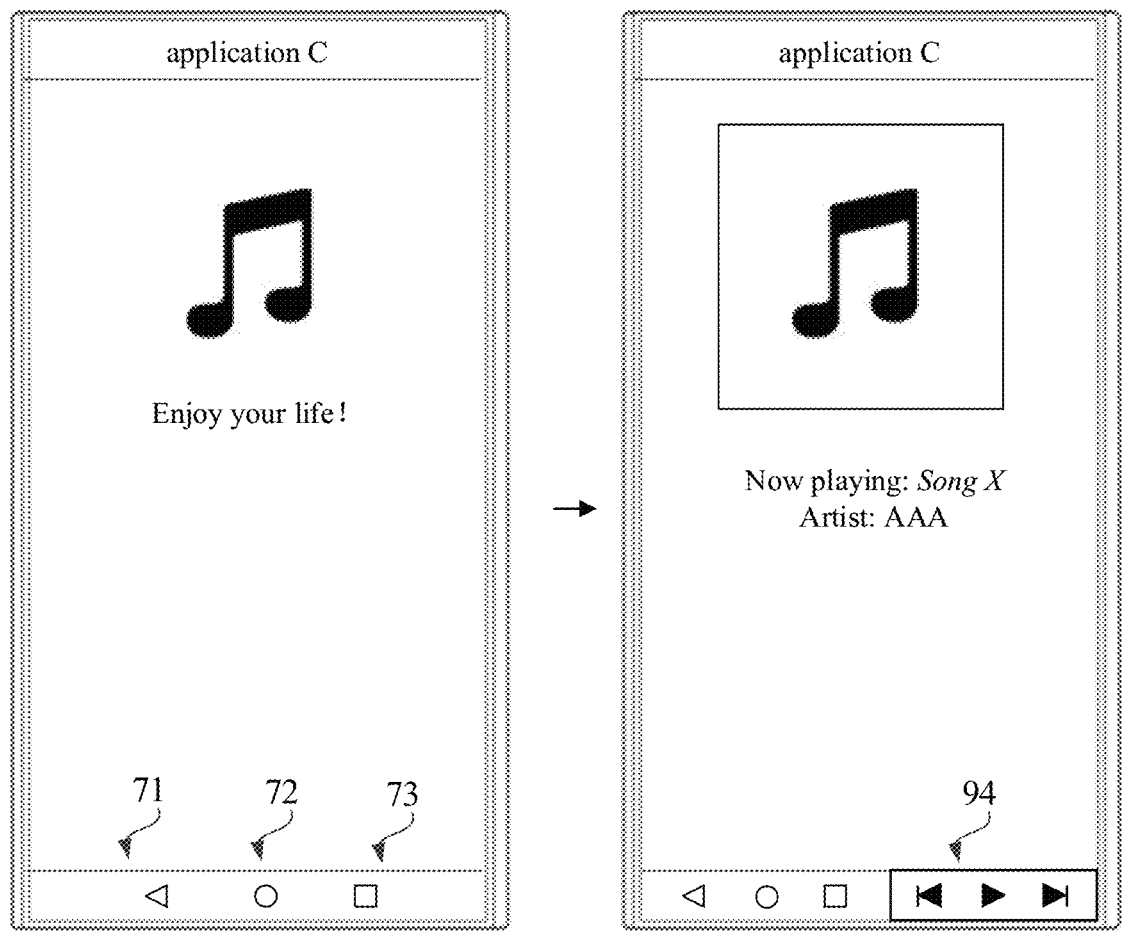
FIG. 11 is a schematic interface view of a navigation bar controlling method according to an exemplary embodiment of the present application during specific implementation.

Referring to FIG. 11, in the initial state, the navigation bar 70 displayed on the terminal includes the back key 71, the home key 72, and the menu key 73. When the application C capable of playing multimedia files starts reading the e-book, the application program C sends the first invoke request to the operating system through the preset function interface, and the first invoke request is used to request to set a control for controlling the playback state and three target functions corresponding to the control, the three target functions include pausing playback, playing the previous file and playing the next file. The operating system displays the function control 94 on the navigation bar according to the first invoke request, and the function control 94 is displayed on the right area of the menu key 73. Optionally, the user can click the buttons on the function control 94 to implement the functions of pausing playback, playing the previous file, and playing the next file, respectively.

Optionally, when the application C exits, the display of the function control 94 is cancelled by the operating system.

4, when the application includes the function of text editing, the at least one function control is configured to adjust the font, and the at least one target function is configured to change the font, add the underline, bold the font, or tilt the front.

The function of adjusting the font is configured to determine one of a plurality of fonts provided by the operating system as the current font. The function of adding the underline is configured to add an underline under the selected text. The function of bolding font is configured to switch the selected text from the normal display state to the bold display state.

5, when the application includes the function of text editing, the at least one function control is configured to adjust the paragraph format, and the at least one target function includes at least one of left alignment, right alignment, and center alignment.

The function of left alignment is configured to align the left end of lines in the selected text. The function of right alignment is configured to align the right end of lines in the selected text. The function of center alignment is configured to align the lines in the selected text according to the center.

6, when the application includes the function of text displaying, the at least one function control is configured to adjust the screen brightness, and the at least one target function is configured to increase the screen brightness or decrease the screen brightness.

7, when the application includes the function of file receiving, the at least one function control is configured to display a recently received file, and the at least one target function is configured to open the recently received file.

For example, the application is an instant messaging application. When a small video sent by a friend is received, an icon corresponding to the small video is displayed on the navigation bar. When the user clicks the icon, the instant messaging application plays the small video.

8, when the application includes the function of message receiving, the at least one function control is configured to display the prompt of a recently received message, and the at least one target function is configured to display the recently received message.

For example, the application is an instant messaging application. When receiving a chat message sent by friend X, an icon corresponding to friend X is displayed on the navigation bar. When the user clicks the icon, the instant messaging application switches to the chat interface of friend X and plays the chat message.

9, when the application includes the function of screenshot, the at least one function control is configured to display the thumbnail of the screenshot image, and the at least one target function is configured to display the screenshot image.

For example, the application is a screen capture application. When an image Y is captured according to a user operation, a thumbnail corresponding to the image Y is displayed on the navigation bar. When the user clicks the thumbnail, the screen capture application displays the original image data of the image Y in a user interface.

10, when the application includes a function of sharing a target file, the at least one function control is configured to trigger the sharing access of the displaying file, and the at least one target function is configured to share the target file to other applications.

It should be noted that, because there are many types of applications, and the corresponding function controls and target functions are also various, this application will not repeat the description of each application separately.

The following are device embodiments of the present application. For the parts not described in detail in the device embodiments, reference may be made to the technical details disclosed in the above method embodiments.

Figure 12:
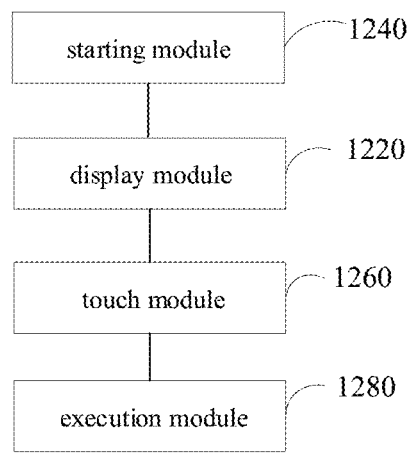
FIG. 12 is a block view of a navigation bar controlling device according to an exemplary embodiment of the present application.

Please refer to FIG. 12, which is a schematic structural view of a navigation bar controlling device according to embodiments of the present application. The navigation bar controlling device can be implemented as all or part of the terminal through software, hardware, and a combination of both. The navigation bar controlling device includes a display module 1220, a starting module 1240, a touch module 1260 and an execution module 1280.

The display module 1220 is configured to display a navigation bar, and the navigation bar comprising at least one virtual button;

The starting module 1240 is configured to start an application; and

The display module 1220 is configured to display at least one function control on the navigation bar according to the running application, and the at least one function control is configured to trigger at least one target function of the application.

In an optional embodiment, the display module 1220 includes a receiving unit and a display unit.

The receiving unit is configured to receive a first invoke request from the running application to a preset function interface, the first invoke request is configured to set the at least one function control and the at least one target function, and the preset function interface is provided by an operating system for editing a display state of the navigation bar;

The display unit is configured to display the at least one function control on the navigation bar.

In an optional embodiment, the receiving unit is configured to receive the first invoke request from the application to the preset function interface, after the running application is started; or the receiving unit is configured to receive the first invoke request from the application to the preset function interface, when the running application is switched from a foreground running state to a background running state; or the receiving unit is configured to receive the first invoke request from the application to the preset function interface, when a foreground operation interface of the running application is switched to a preset interface.

In an optional embodiment, the display module 1220 is configured to obtain a current holding mode, wherein the holding mode is one of a left-hand holding mode and a right-hand holding mode, the display module is configured to display the at least one function control on a left area of the navigation bar, and display the at least one virtual button on a right area of the navigation bar, when the current holding mode is the left-hand holding mode, and the display module is configured to display the at least one function control on the right area of the navigation bar, and display the at least one virtual button on the left area of the navigation bar, when the current holding mode is the right-hand holding mode.

In an optional embodiment, the at least one function control and the at least one virtual button are equally spaced on the navigation bar.

In an optional embodiment, the at least one function control includes at least two function controls; the display unit is configured to display an aggregation button on the navigation bar; the receiving unit is configured to receive a first signal triggered on the aggregation button; and the display unit is configured to replace the at least one virtual button and the aggregation button on the navigation bar with the at least two function controls according to the first signal.

In an optional embodiment, the receiving unit is configured to receive a second signal triggered on the navigation bar; and the display unit is configured to restore the at least two function controls on the navigation bar to the at least one virtual button and the aggregation button according to the second signal.

In an optional embodiment, the display module 1220 includes the touch module 1260 and the execution module 1280; the touch module 1260 is configured to receive a touch signal triggered on the at least one function control; and the execution module 180 is configured to perform the at least one target function corresponding to the at least one function control according to the touch signal.

In an optional embodiment, the application includes a function of file downloading, the at least one function control is configured to display a download state, and the at least one target function is configured to view the downloaded content; or the application includes a function of text editing, the at least one function control is configured to adjust a text size, and the at least one target function is configured to increase the text size or reduce the text size; or the application includes a function of text editing, the at least one function control is configured to adjust a font, and the at least one target function is configured to change the font, add an underline, bold the font, or tilt the front; or the application includes a function of text editing, the at least one function control is configured to adjust a paragraph format, and the at least one target function includes at least one of left alignment, right alignment, and center alignment; or the application includes a function of text displaying, the at least one function control is configured to adjust a screen brightness, and the at least one target function is configured to increase the screen brightness or decrease the screen brightness; or the application includes a function of file receiving, the at least one function control is configured to display a recently received file, and the at least one target function is configured to open the recently received file; or the application includes a function of message receiving, the at least one function control is configured to display a prompt of a recently received message, and the at least one target function is configured to display the recently received message; or the application includes a function of screenshot, the at least one function control is configured to display a thumbnail of a screenshot image, and the at least one target function is configured to display the screenshot image; or the application includes a function of sharing a target file, the at least one function control is configured to trigger a sharing access of a displaying file, and the at least one target function is configured to share the target file to other applications; or the application includes a function of multimedia file playback, the at least one function control is configured to control a playback state, and the at least one target function includes at least one of starting playback, pausing playback, playing the previous file, playing the next file, fast forward playback, fast backward playback and adjusting volume.

In an optional embodiment, the display module 1220 is configured to remove the display of the at least one function control from the navigation bar when the application exits.

In an optional embodiment, the receiving unit is configured to receive a second invoke request from the running application to the preset function interface, the second invoke request is configured to cancel the at least one function control and the at least one target function; and the display unit is configured to remove the display of the at least one function control from the navigation bar.

It should be noted that the display module and the starting module may be implemented by a processor executing instructions stored in a memory (such as instructions for displaying a user interface and the navigation bar), and the above-mentioned touch module may be implemented by a touch display screen executing instructions stored in a memory (such as a driver program for driving a touch screen display), and the execution module may be implemented by the processor executing instructions stored in a memory (such as program instructions for performing the at least one target function).

The embodiments of the present invention also provide a computer readable medium, the computer readable medium stores at least one instruction, and the at least one instruction is loaded and executed by a processor to implement the navigation bar controlling method according to the above embodiments.

The embodiments of the present invention also provide a computer program product, the computer program product stores at least one instruction, and the at least one instruction is loaded and executed by a processor to implement the navigation bar controlling method according to the above embodiments.

Those skilled in the art should be aware that in one or more of the above examples, the functions described in the embodiments of the present application may be implemented by hardware, software, firmware, or any combination thereof. When implemented in software, these functions may be stored in or transmitted over as one or more instructions or code on a computer readable medium. The computer readable medium includes computer storage media and communication media, the communication media include any medium that facilitates transfer of a computer program from one place to another. A storage media may be any available media that can be accessed by a general purpose or special purpose computer.

The above are only preferred embodiments of the present application and are not intended to limit the present application. Any modification, equivalent replacement, or improvement made within the spirit and principle of this application shall be included in the protection scope of this application.

What is claimed is:

1. A navigation bar controlling method, comprising:
    displaying a virtual navigation bar on a bottom display area of a touch display screen of a terminal, the virtual navigation bar displaying a plurality of virtual buttons comprising a back key, a home key and a menu key;
    starting an application;
    adding at least one function control related to the application onto the virtual navigation bar to display simultaneously the at least one function control and the virtual buttons on the virtual navigation bar, in response to detecting switching from a foreground operation interface to another different foreground interface of the application, wherein the at least one function control is configured to trigger at least one target function of the application;
    obtaining a current holding mode of the terminal, wherein the holding mode is one of a left-hand holding mode and a right-hand holding mode; and
    positioning the at least one function control on a left area of the virtual navigation bar and positioning the virtual buttons on a right area of the virtual navigation bar, in response to detecting the left-hand holding mode; alternatively, positioning the at least one function control on the right area of the virtual navigation bar and positioning the virtual buttons on the left area of the virtual navigation bar, in response to detecting the right-hand holding mode;

wherein when the at least one function control comprises at least two function controls, the adding at least one function control related to the application onto the virtual navigation bar to display simultaneously the at least one function control and the virtual buttons on the virtual navigation bar, comprises:

adding an aggregation button onto the virtual navigation bar to display simultaneously the aggregation button and the virtual buttons on the virtual navigation bar; and the method further comprises:

receiving a first signal triggered on the aggregation button; and replacing, according to the first signal, the aggregation button and the virtual buttons displayed on the virtual navigation bar with the at least two function controls, to display just the at least two function controls on the virtual navigation bar.

2. The method of claim 1, the operation of adding at least one function control onto the virtual navigation bar, comprising:

receiving a first invoke request from the application to a preset function interface, wherein the first invoke request is configured to set the at least one function control and the at least one target function, and the preset function interface is provided by an operating system for editing a display state of the virtual navigation bar; and adding the at least one function control onto the virtual navigation bar in response to the first invoke request.

3. The method of claim 2, after the operation of displaying the at least one function control on the virtual navigation bar, further comprising:

receiving a second invoke request from the application to the preset function interface or another preset function interface, wherein the second invoke request is configured to cancel the at least one function control and the at least one target function; and removing the display of the at least one function control from the virtual navigation bar.

4. The method of claim 3, wherein the preset function interface is used to receive at least one of the first invoke request and the second invoke request.

5. The method of claim 2, the operation of receiving a first invoke request from the application to a preset function interface further comprising:

receiving the first invoke request from the application to the preset function interface, when the application is switched from a foreground running state to a background running state.

6. The method of claim 2, the operation of receiving a first invoke request from the application to a preset function interface further comprising:

receiving the first invoke request from the application to the preset function interface, when the application is started.

7. The method of claim 2, the operation of adding the at least one function control onto the virtual navigation bar comprising: adding the at least one function control between two of the virtual buttons.

8. The method of claim 1, further comprising:

adding the at least one function control onto the virtual navigation bar, in response to detecting switching from a foreground running state to a background running state of the application or startup of the application.

9. The method of claim 1, wherein the at least one function control and the plurality of virtual buttons are equally spaced on the virtual navigation bar.

10. The method of claim 1, after the operation of replacing the virtual buttons and the aggregation button displayed on the virtual navigation bar with the at least two function controls according to the first signal, further comprising:

receiving a second signal triggered on the virtual navigation bar; and restoring the at least two function controls on the virtual navigation bar to the virtual buttons and the aggregation button according to the second signal.

11. The method of claim 10, wherein a restore button is displayed on the virtual navigation bar, and the second signal is generated by clicking the restore button.

12. The method of claim 1, after the operation of displaying the at least one function control on the virtual navigation bar, further comprising:

receiving a touch signal triggered on the at least one function control; and performing the at least one target function corresponding to the at least one function control according to the touch signal.

13. The method of claim 12, wherein the application comprises one of the following:

a function of file downloading, the at least one function control is configured to display a download state, and the at least one target function is configured to view downloaded content;

a function of text editing, the at least one function control is configured to adjust a text size, and the at least one target function is configured to increase the text size or reduce the text size;

a function of text editing, the at least one function control is configured to adjust a font, and the at least one target function is configured to change the font, add an underline, bold the font, or tilt the font;

a function of text editing, the at least one function control is configured to adjust a paragraph format, and the at least one target function comprises at least one of left alignment, right alignment, and center alignment;

a function of text displaying, the at least one function control is configured to adjust a screen brightness, and the at least one target function is configured to increase the screen brightness or decrease the screen brightness;

a function of file receiving, the at least one function control is configured to display a recently received file, and the at least one target function is configured to open the recently received file;

a function of message receiving, the at least one function control is configured to display a prompt of a recently received message, and the at least one target function is configured to display the recently received message;

a function of screenshot, the at least one function control is configured to display a thumbnail of a screenshot image, and the at least one target function is configured to display the screenshot image;

a function of sharing a target file, the at least one function control is configured to trigger a sharing access of a displaying file, and the at least one target function is configured to share the target file to other applications; and a function of multimedia file playback, the at least one function control is configured to control a playback state, and the at least one target function comprises at least one of starting playback, pausing playback, playing a previous file, playing a next file, fast forward playback, fast backward playback and adjusting volume.

14. The method of claim 12, wherein each of the at least one function control corresponds to at least two different target functions, and the different target functions are executed according to different touch signals performed on each of the at least one function control.

15. The method of claim 1, after the operation of displaying the at least one function control on the virtual navigation bar, further comprising:
removing the display of the at least one function control from the virtual navigation bar when the application exits.

16. The method of claim 1, wherein the terminal comprises a middle frame and an edge touch sensor disposed on the middle frame, and the edge touch sensor comprises at least one left edge touch sensor located on a left side of the middle frame and at least one right edge touch sensor located on a right side of the middle frame,
the operation of obtaining a current holding mode comprises:
determining the current holding mode is the left-hand holding mode, when a contact area corresponding to at least one left contact signal is larger than a contact area corresponding to at least right contact signal; and
determining the current holding mode is the right-hand holding mode, when the contact area corresponding to the at least one right contact signal is larger than the contact area corresponding to the at least one left contact signal, wherein the at least one left edge touch sensor collects the at least one left contact signal, and the at least one right edge touch sensor collects the at least one right contact signal.

17. The method of claim 1, wherein the starting an application comprises:
starting the application manually by a user; or
starting the application automatically by an operating system of the terminal.

18. A terminal, comprising a touch display screen, a processor, and a memory, wherein the memory stores instructions thereon, and the instructions are loaded and executed by the processor to implement a navigation bar controlling method, and the method comprising:
displaying a virtual navigation bar on a bottom display area of the touch display screen, the virtual navigation bar displaying a plurality of system-level one virtual buttons comprising a back key, a home key and a menu key;
starting an application on the terminal;
adding an aggregation button corresponding to at least two function controls onto the virtual navigation bar to display simultaneously the aggregation button and the virtual buttons on the virtual navigation bar, in response to detecting switching from a foreground operation interface to another different foreground interface of the application, wherein each of the at least two function controls is configured to trigger a corresponding target function of the application;
receiving a first signal triggered on the aggregation button; and
replacing, according to the first signal, the aggregation button and the virtual buttons displayed on the virtual navigation bar with the at least two function controls, to display just the at least two function controls on the virtual navigation bar.

19. A non-transitory computer readable medium, wherein the non-transitory computer readable medium stores instructions thereon, and the instructions are loaded and executed by a processor to implement a navigation bar controlling method, and the method comprising:
displaying a virtual navigation bar on a bottom display area of a touch display screen of a terminal, the virtual navigation bar displaying a plurality of system-level virtual buttons comprising a back key, a home key and a menu key;
starting an application on the terminal;
adding at least one function control on the virtual navigation bar to display simultaneously the at least one function control and the virtual buttons on the virtual navigation bar, in response to detecting switching from a foreground operation interface to another different foreground interface of the application, wherein each of the at least one function control is configured to trigger at least two different target functions of the application; and
executing the at least two different target functions corresponding to each of the at least one function control, in response to detecting different touch signals performed on the function control.

20. The non-transitory computer readable medium of claim 19, wherein the executing the at least two different target functions corresponding to each of the at least one function control, in response to detecting different touch signals performed on the function control comprises:
performing a first target function corresponding to the function control, in response to a click touch signal triggered on the function control; and
performing a second target function corresponding to the function control, in response to a double-click touch signal triggered on the function control, the first target function being different from the second target function.

* * * * *